(12) United States Patent
Sorger et al.

(10) Patent No.: US 10,302,050 B2
(45) Date of Patent: May 28, 2019

(54) FILTER ELEMENT, FILTER HOUSING OF AN AIR FILTER AND AIR FILTER

(71) Applicant: Mann+Hummel GMBH, Ludwigsburg (DE)

(72) Inventors: Nadine Sorger, Fellbach (DE); Michael Heim, Korntal-Muenchingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 42 days.

(21) Appl. No.: 14/969,756

(22) Filed: Dec. 15, 2015

(65) Prior Publication Data
US 2016/0102638 A1    Apr. 14, 2016

Related U.S. Application Data

(63) Continuation of application No. PCT/EP2014/062199, filed on Jun. 12, 2014, which is
(Continued)

(30) Foreign Application Priority Data

Jun. 20, 2013  (DE) .......................... 10 2013 010 218
May 13, 2014  (DE) .......................... 10 2014 006 850
(Continued)

(51) Int. Cl.
*B01D 46/00*  (2006.01)
*B01D 46/24*  (2006.01)
(Continued)

(52) U.S. Cl.
CPC ... *F02M 35/02483* (2013.01); *B01D 46/0005* (2013.01); *B01D 46/009* (2013.01);
(Continued)

(58) Field of Classification Search
None
See application file for complete search history.

(56) References Cited

U.S. PATENT DOCUMENTS 1,704,614 A * 3/1929 Jonston .................. B60R 7/084
                                                                   242/598.4
3,116,030 A * 12/1963 Leotta .................. A47K 10/405
                                                                   242/596.3
(Continued)

FOREIGN PATENT DOCUMENTS

DE         19960175 A1    9/2001
DE    102005025192 A1    12/2005
(Continued)

*Primary Examiner* — Duane Smith
*Assistant Examiner* — Brit E. Anbacht
(74) *Attorney, Agent, or Firm* — James Hasselbeck

(57) ABSTRACT

A filter element of an air filter, including: a filter medium for filtering air, partially surrounding an element interior of the filter element with respect to an element axis; wherein the filter element replaceably arranged within an openable filter housing having at least one inlet for air to be purified and at least one outlet for purified air so that said filter element separates said inlet from said outlet; wherein the filter element has at least one element-side support element on an outer side facing away from the element interior on at least one end face which is axial with respect to the element axis; wherein the support element includes at least one element supporting portion, which, at least in the installed state of the filter element in the filter housing, has a surface contour deviating from a flat surface on its end face facing away from the element interior.

10 Claims, 14 Drawing Sheets

Related U.S. Application Data a continuation of application No. 14/017,767, filed on Sep. 4, 2013.

(30) Foreign Application Priority Data

| | | |
|---|---|---|
| May 13, 2014 | (DE) | 10 2014 006 852 |
| May 13, 2014 | (DE) | 10 2014 006 853 |
| May 22, 2014 | (DE) | 10 2014 007 411 |

(51) Int. Cl.
*F02M 35/02* (2006.01)
*F02M 35/09* (2006.01)
*F02M 35/024* (2006.01)

(52) U.S. Cl.
CPC ...... *B01D 46/0041* (2013.01); *B01D 46/2411* (2013.01); *B01D 46/2414* (2013.01); *F02M 35/0203* (2013.01); *F02M 35/0204* (2013.01); *F02M 35/02416* (2013.01); *F02M 35/02425* (2013.01); *F02M 35/02433* (2013.01); *B01D 2265/026* (2013.01); *B01D 2275/201* (2013.01); *B01D 2275/208* (2013.01); *F02M 35/09* (2013.01)

(56) References Cited

U.S. PATENT DOCUMENTS

| | | | | |
|---|---|---|---|---|
| 3,282,519 | A * | 11/1966 | Rheinstrom | A47K 10/38 242/596.8 |
| 3,692,186 | A * | 9/1972 | Marzocchi | B01D 39/2017 210/494.1 |
| 4,065,276 | A * | 12/1977 | Nakaya | B01D 46/2403 181/229 |
| 4,105,561 | A * | 8/1978 | Domnick | B01D 17/045 210/232 |
| 4,135,899 | A * | 1/1979 | Gauer | B01D 46/0024 210/338 |
| 4,151,095 | A * | 4/1979 | Wright | B01D 29/07 156/218 |
| 4,204,846 | A * | 5/1980 | Brenholt | B01D 46/0005 55/288 |
| 4,304,580 | A * | 12/1981 | Gehl | B01D 46/0004 210/338 |
| 4,482,367 | A * | 11/1984 | Howeth | B01D 46/0005 406/172 |
| 4,493,717 | A | 1/1985 | Berger et al. | |
| 4,507,203 | A * | 3/1985 | Johnston | B01D 29/15 210/445 |
| 4,535,947 | A * | 8/1985 | Hidle | A47K 10/38 242/129.51 |
| 4,758,256 | A * | 7/1988 | Machado | B01D 46/0005 210/232 |
| 5,071,456 | A * | 12/1991 | Binder | B01D 46/2414 55/502 |
| 5,413,712 | A | 5/1995 | Gewiss et al. | |
| 5,699,601 | A | 12/1997 | Gilliam et al. | |
| 5,763,984 | A * | 6/1998 | Day | A47K 10/3827 242/596.8 |
| 6,056,235 | A * | 5/2000 | Brozinsky | A47K 10/32 242/598.6 |
| 6,059,851 | A | 5/2000 | Depietro et al. | |
| 6,152,979 | A | 11/2000 | Cappuyns | |
| 6,385,810 | B1 * | 5/2002 | Lang | A47L 9/102 15/352 |
| 6,425,932 | B1 * | 7/2002 | Huehn | B01D 46/0005 55/471 |
| 6,569,219 | B1 * | 5/2003 | Connor | B01D 46/2414 55/490 |
| 6,968,596 | B2 * | 11/2005 | Oh | A47L 9/104 15/353 |
| 7,063,730 | B2 * | 6/2006 | Connor | B01D 46/0005 55/493 |
| 7,122,067 | B2 | 10/2006 | Prellwitz et al. | |
| 7,662,203 | B2 | 2/2010 | Scott et al. | |
| 7,810,210 | B2 * | 10/2010 | Yoo | A47L 5/225 15/327.2 |
| 7,931,722 | B2 * | 4/2011 | Sepke | A47L 9/165 15/347 |
| 8,038,756 | B2 * | 10/2011 | Iddings | B01D 46/009 210/450 |
| 8,292,984 | B2 * | 10/2012 | Baseotto | B01D 46/0024 55/498 |
| 8,414,675 | B2 * | 4/2013 | Iddings | B01D 46/0001 55/498 |
| 8,657,900 | B2 | 2/2014 | Menssen | |
| 8,673,042 | B2 | 3/2014 | Langner | |
| 8,940,070 | B2 | 1/2015 | Traub | |
| 9,132,371 | B2 | 9/2015 | Heim et al. | |
| 2001/0018865 | A1 * | 9/2001 | Wegelin | A47L 5/28 95/268 |
| 2002/0073663 | A1 * | 6/2002 | Sepke | A47L 5/28 55/467 |
| 2002/0073667 | A1 * | 6/2002 | Barris | B01D 39/1623 55/486 |
| 2003/0121242 | A1 | 7/2003 | Rieger et al. | |
| 2003/0217534 | A1 * | 11/2003 | Krisko | B01D 45/12 55/337 |
| 2008/0010958 | A1 * | 1/2008 | Fester | A47L 9/122 55/472 |
| 2008/0250763 | A1 * | 10/2008 | Widerski | B01D 46/0005 55/357 |
| 2009/0049814 | A1 | 2/2009 | Baseotto et al. | |
| 2009/0094951 | A1 * | 4/2009 | Baseotto | B01D 46/0024 55/498 |
| 2009/0314249 | A1 | 12/2009 | Taniguchi | |
| 2010/0000414 | A1 * | 1/2010 | Williams | B01D 46/2414 96/226 |
| 2010/0229511 | A1 | 9/2010 | Steins et al. | |
| 2013/0086877 | A1 * | 4/2013 | Kori | B01D 46/0024 55/482 |
| 2013/0152520 | A1 | 6/2013 | Tobe et al. | |
| 2013/0232923 | A1 | 9/2013 | Heim et al. | |
| 2013/0263744 | A1 * | 10/2013 | Osendorf | B01D 46/0005 96/380 |
| 2014/0260136 | A1 | 9/2014 | Kaiser | |
| 2014/0298612 | A1 * | 10/2014 | Williams | A47L 9/10 15/347 |

FOREIGN PATENT DOCUMENTS

| | | |
|---|---|---|
| DE | 202008001819 U1 | 6/2009 |
| DE | 102011106500 A1 | 12/2012 |
| DE | 102012006426 A1 | 10/2013 |
| EP | 2213869 A2 | 8/2010 |
| GB | 1367701 A | 9/1974 |
| WO | 2009014986 A1 | 1/2009 |

\* cited by examiner

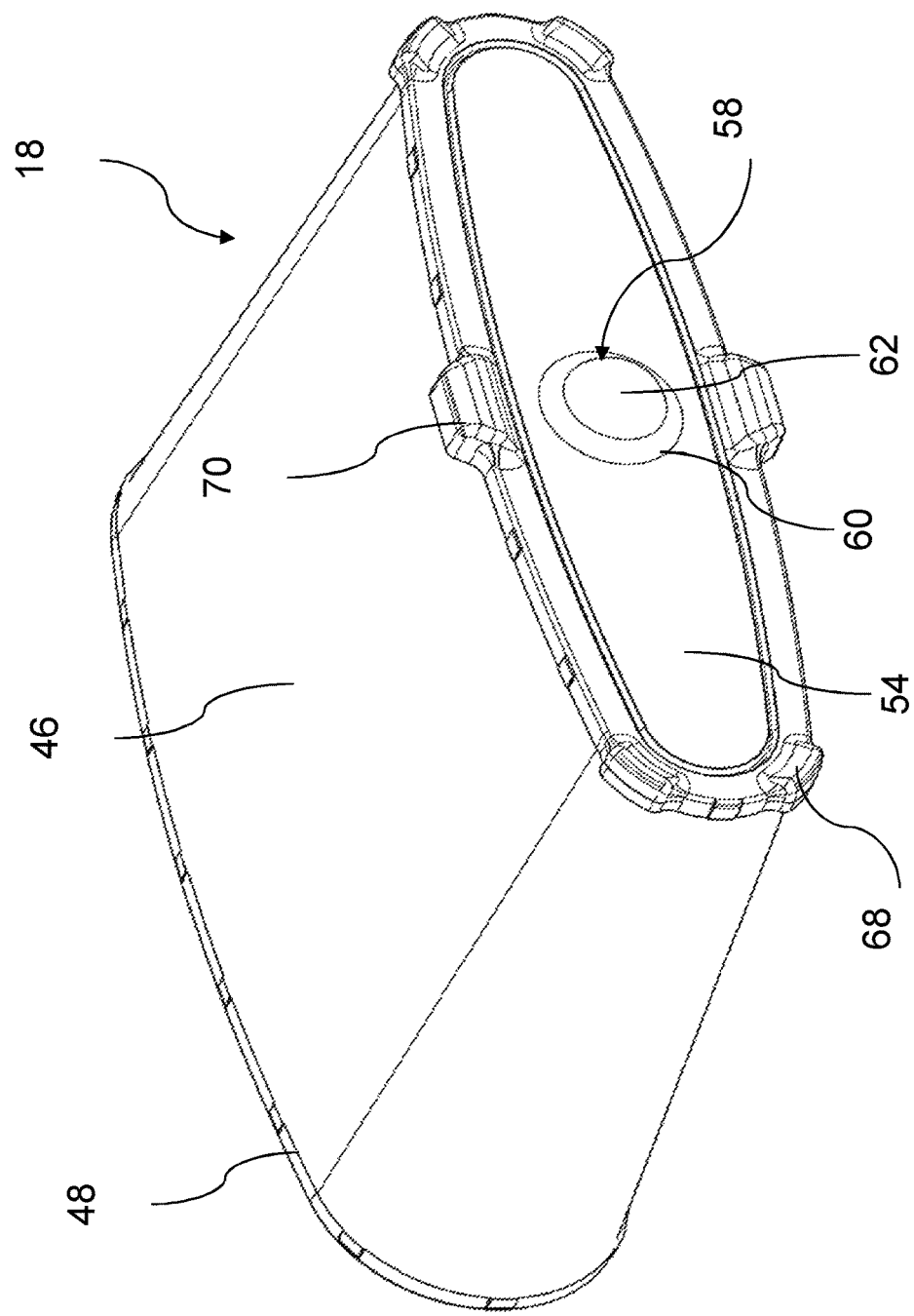

FILTER ELEMENT, FILTER HOUSING OF AN AIR FILTER AND AIR FILTER

TECHNICAL FIELD

The invention relates to a filter element of an air filter, in particular of an internal combustion engine, in particular of a motor vehicle, in particular of a commercial vehicle, with at least one filter medium for filtering air, which at least partially surrounds an element interior with respect to an element axis, and which filter element can be replaceably arranged in an openable filter housing having at least one inlet for air to be purified and at least one outlet for purified air in such a way that said filter element separates the at least one inlet from the at least one outlet.

The invention further relates to a filter housing of an air filter, in particular of an internal combustion engine, in particular of a motor vehicle, in particular of a commercial vehicle, which is openable, which has at least one inlet for air to be purified and at least one outlet for purified air and in which at least one filter element, in particular a filter element according to the invention with at least one filter medium for filtering air which at least partially surrounds an element interior with respect to an element axis, can be replaceably arranged in such a way that said filter element separates the at least one inlet from the at least one outlet.

Moreover, the invention relates to an air filter, in particular of an internal combustion engine, in particular of a motor vehicle, in particular of a commercial vehicle, with an openable filter housing which has at least one inlet for air to be purified and at least one outlet for purified air and in which at least one filter element with at least one filter medium for filtering air which at least partially surrounds an element interior with respect to an element axis can be replaceably arranged in such a way that said filter element separates the at least one inlet from the at least one outlet.

BACKGROUND OF THE INVENTION

An air filter of an air intake tract of an internal combustion engine of a motor vehicle known from the market has a filter housing comprised of a housing container and a housing cover. The housing cover is removable from the housing container for opening the filter housing. The filter housing has an inlet for air to be purified and an outlet for purified air. A round filter element is arranged in the filter housing such that it separates the inlet from the outlet. The round filter element has a filter medium for filtering the air, which surrounds the element interior with respect to an element axis in a circumferentially closed manner. The filter element is replaceably arranged in the filter housing.

SUMMARY OF THE INVENTION

The object of the invention is to design a filter element, a filter housing of an air filter and an air filter of the aforementioned type, in which a positioning and/or a holding of the filter element in the filter housing can be improved, in particular simplified.

This object is achieved by the filter element according to the invention in that the filter element has at least one element-side support element on an outer side facing away from the element interior on at least one end face which is axial with respect to the element axis, which support element comprises at least one element supporting portion, which, at least in the installed state of the filter element in the filter housing, has a surface contour deviating from a flat surface on its end face facing away from the element interior.

According to the invention, the end face of the at least one element supporting portion has an uneven surface contour. With an uneven end face, the at least one element supporting portion can be at least partially supported at least axially with respect to the element axis against a corresponding surface of an axial end face of at least one corresponding housing supporting portion of the filter housing. The uneven surface contour enables a more versatile support than a flat surface contour.

Due to the arrangement of the at least one support element, the filter element can be constructed completely axially on the outer side of the end face. It can thus be arranged in the filter housing in a space-saving manner.

The filter element can advantageously be clamped and held in the axial direction between two opposing housing supporting portions of the filter housing.

Advantageously, the axial end face of the at least one housing supporting portion may have a surface contour which deviates from a flat surface.

Advantageously, the particular surface contours of the end faces of the at least one housing supporting portion and the at least one element supporting portion can be adapted to one another.

The corresponding end face of the at least one housing supporting portion can advantageously have a surface contour fitting the end face of the at least one element supporting portion, in particular complementarily. In this way, the at least one element supporting portion and the at least one housing supporting portion may engage with one another in a form locking manner. They may thus interact with an improved force transmission in the axial direction and/or the radial direction and/or circumferential direction with respect to the element axis.

The at least one element supporting portion and the at least one housing supporting portion may advantageously interlock. Force locking can thus be improved.

The surfaces of the end faces of the at least one element supporting portion and the at least one housing supporting portion may lie at least partially against one another with as little play as possible. Support with respect to different spatial directions can thus be further improved. An additional support on the circumferential side of the filter element radial and/or circumferential with respect to the element axis/housing axis can thus optionally be dispensed with. If an additional radial support of the filter element is present, a radial support by means of the at least one housing supporting portion and the at least one element supporting portion is not necessary. An axial support is sufficient there, in particular at a tip of the housing supporting portion/element supporting portion.

Advantageously, the at least one housing supporting portion may extend axially with respect to a housing axis of the filter housing.

When a filter element is correctly installed, the housing axis may advantageously extend parallel, axially or coaxially with the element axis. In this way, the air filter as a whole can be coaxially constructed. The space requirement of the air filter can thus be further reduced.

The element axis and/or the housing axis may advantageously extend axially to an assembly direction of the filter element relative to the filter housing, in particular relative to a housing part with the at least one housing supporting portion. The filter element can thus easily be inserted into the filter housing in the axial direction. In particular, the filter element can be inserted in the axial direction into a corresponding housing part, in particular a housing container. One of the housing parts, in particular the housing cover, may advantageously placed on the filter element and the other housing part in the axial direction.

Advantageously, the at least one support element may additionally be supported in the filter housing in the radial direction and/or circumferential direction with respect to the element axis. In this way, the filter element can be better positioned and/or held with respect to further spatial directions.

Advantageously, the at least one support element and the at least one housing supporting portion may not have a sealing function. In this way, the support function and the possible sealing function can be separated from one another and respectively optimized. A corresponding sealing function may be associated with a component pair separated from the at least one support element and the at least one housing supporting portion and individually optimized.

Advantageously, the at least one support element may be at least partially elastic. In this way, any installation tolerances of the filter element in the filter housing can easily be equalized with the at least one support element. Further, the at least one support element may additionally serve as a vibration damper, in particular during operation of the air filter.

In particular, the at least one support element may be made of elastic material, in particular plastic, in particular polyurethane (PUR), or may comprise such a material. Polyurethane may be simply connected directly or indirectly with the at least one filter medium by means of a corresponding connecting body, in particular an end body or end plate. The at least one support element may advantageously be foamed on or onto the filter medium or the connecting body.

Additionally or alternatively, the at least one support element at least comprises a rigid material, in particular plastic, or consists thereof.

Advantageously, a plurality of identical or different support elements may be arranged on one of the end faces of the filter element. In this way, the support can be further improved. A tilting of the filter element with respect to the element axis can thus be prevented.

Advantageously, the element interior can be closed at the end face of the filter element on which the at least one support element is located. In this way, a flow of air out of the element interior or into the element interior can be prevented there. It may thus be achieved that the air must flow through the filter medium. The air may flow through the filter medium from radially outside to radially inside into the element interior, or in the opposite direction out of the element interior. The air may flow through a corresponding throughflow opening on the end face of the filter element axially opposite the at least one support element into the element interior or out of the element interior.

The filter element may advantageously be a hollow filter element, in particular a round filter element with a round cross-section, an oval round filter with an oval cross-section, a flat-oval round filter element with a flattened oval cross-section, a conical round filter element, in which the round cross-section tapers in the axial direction of the major axis, a conical oval round filter element, in which the oval cross-section tapers in the axial direction at least in the direction of a transverse axis, a conical flat-oval round filter element, in which the flat-oval cross section tapers in the axial direction at least in the direction of a transverse axis, or a hollow filter element with another type of, especially square, cross-section and/or another type of axial cross-sectional extent in the direction of the major axis.

With respect to the element axis, the filter medium may advantageously be circumferentially closed or open. The filter medium may in particular be star-shaped, preferably zigzag-shaped or wave-shaped, folded or bent. The filter medium may also be unfolded or unbent.

The filter medium may be a filter paper, nonwoven filter fabric or another type of filter medium suitable for the filtration of air. The filter medium may be one or more layers.

The filter element can advantageously have a support body, in particular a support tube. The stability of the filter element, in particular of the filter medium, can be increased with the support body. The support body may advantageously be located in the element interior. A support body may also be provided which surrounds the filter medium radially outwardly. A circumferential wall of the support body may advantageously be permeable to air. The circumferential wall may advantageously be skeleton- or grid-like. The support body may advantageously be made of plastic. The filter medium may advantageously be supported on the support body.

The air filter may advantageously be part of the air intake tract of an internal combustion engine. It may be used for the purifying of combustion air which is supplied to the internal combustion engine. However, the invention is not limited to an air filter of an air intake tract of an internal combustion engine of a motor vehicle, in particular a commercial vehicle. Rather, it may also be used in other types of air systems of motor vehicles. The air filter may also be a cabin air filter. The air filter can also be used outside of the automotive field, in particular in industrial motors.

Advantageously, the air filter may be a part of an air intake system of a commercial motor vehicle, in particular a commercial vehicle, in particular a bus, construction machine or agricultural machine.

The air intake system may advantageously be located on a vertical wall, in particular a back side, of a cab of a commercial vehicle.

In an advantageous embodiment, the at least one element supporting portion may comprise or at least contribute to at least one element-side form locking portion for form locking connection with at least one corresponding housing-side form locking portion.

Advantageously, the at least one element side form locking portion can comprise at least one surface portion, in particular prongs, waves and/or steps, which can act to effect an axial force transmission with at least one directional component and/or a parallel force transmission with at least one directional component and/or a circumferential force transmission with at least one directional component with respect to the element axis.

The at least one element side form locking portion and the at least one housing side form locking portion may advantageously engage in one another in a form-locking manner, in particular interlink with one another.

The interacting form locking portions may have corresponding elevations and depressions which can engage with one another in a form locking manner.

In a further advantageous embodiment, the at least one element side support element may have at least one element supporting portion, which extends circumferentially with respect to the element axis.

The at least one element supporting portion may advantageously have a cylindrical or conical shape. Such a shape can enable an optimal force transmission from the at least one element supporting portion to the at least one housing supporting portion radially to a major axis of the at least one element supporting portion.

The at least one element supporting portion may advantageously have an oval, flat oval, round or polygonal cross-section.

The at least one element supporting portion may be circumferentially closed with respect to the element axis. It may also have interruptions.

In a further advantageous embodiment, the end face of the at least one, in particular circumferentially extending, element supporting portion facing away from the element interior may have an alternating, in particular wave-like and/or step-like and/or spike-like surface contour.

In this way, a stable and precise form locking connection between the at least one element supporting portion and the at least one housing supporting portion can be realized. The flanks, waves and/or steps of the at least one element supporting portion and the at least one housing supporting portion may engage in one another, in particular interlink with one another. A support in the axial, radial and circumferential direction can thus be improved.

In a further advantageous embodiment, the at least one element side support element may have at least one element supporting portion which is central with respect to the element axis, in particular coaxial or eccentric with respect to the element axis, which element supporting portion has in particular at least one depression and/or at least one elevation.

On the end face, the at least one element supporting portion may advantageously be designed at least partially pyramidal, cross-shaped, conical, cylindrical, barrel-shaped and/or (semi)spherical and/or uneven in a different manner.

Advantageously, the at least one element supporting portion may taper in the form of an elevation axial to the element axis when viewed from the element interior out. Alternatively, the at least one element supporting portion may taper in the form of a depression when viewed inward toward the element interior. In both cases, bringing together with at least one corresponding housing supporting portion can thus be simplified. Advantageously, the tip may show a pyramidal, conical or similar depression toward the element interior. Alternatively, the tip may show a pyramidal, conical or similar elevation away from the element interior.

In a further advantageous embodiment, the at least one element supporting portion, in particular the surface contour of the end face, may be realized separately from the filter housing, in particular prefabricated.

Alternatively or in addition, the at least one housing supporting portion, in particular the surface contour of the end face, may advantageously be realized separately from the filter element, in particular prefabricated. In this way, the at least one element supporting portion and/or the at least one housing supporting portion, in particular the respective surface contour of the end face, exists even in an uninstalled state of the filter element, as well as when the filter element and filter housing are separated before installation or after removal.

The shape of at least one element supporting portion and/or the at least one housing supporting portion may be predetermined. The shape of the at least one element supporting portion and/or the at least one housing supporting portion may not thus arise only during or by means of the bringing together of the at least one element supporting portion with the at least one corresponding housing supporting portion. In this way, a force required during bringing together of the at least one element supporting portion and the at least one housing supporting portion may be reduced. Further, the at least one element supporting portion and the at least one housing supporting portion may thus serve as a positioning aid for positioning the filter element in the filter housing.

The at least one element supporting portion can be realized during the production of the at least one support element. Accordingly, the at least one housing supporting portion can be realized during the production of the housing or housing part, in particular the housing cover. Advantageously the at least one support element and/or the housing can respectively be formed from plastic, in particular injected or cast.

Alternatively or in addition, at least one element supporting portion may be formed by means of at least one corresponding housing supporting portion or vice versa. The at least one element supporting portion and/or the at least one housing supporting portion may be made from a formable and/or soft, in particular elastic, material. During installation of the filter element into the filter housing, the surface contour of the corresponding end face of the housing supporting portion can be pressed or embedded into the formable material of the at least one element supporting portion and thus form the element side surface contour. Correspondingly, the surface contour of the end face of the element supporting portion can be pressed or embedded into the optionally formable material of the at least one housing supporting portion and thus form the housing side surface contour.

In a further advantageous embodiment, an element side support element may be arranged centrally, in particular coaxially, on the end face of the filter element with respect to the element axis. The filter element can thus be supported centrally. In this way, a uniform support of the filter element on/in the filter housing may occur with only one support element and only one corresponding housing supporting portion. Support can thus be realized with a small footprint of the required components in the filter housing.

Advantageously, the at least one element side support element may be coaxial with the element axis. Alternatively, the at least one element side support element may be arranged so as to be displaced to the element axis, in particular eccentrically, in the region of the center of the end face of the filter element.

Alternatively or in addition, at least one identical or different type of support element can advantageously be provided on the filter element with at least one corresponding housing supporting portion on the housing.

Advantageously, the at least one alternative or additional support element may be arranged circumferentially with respect to the element axis on the end face on which the at least one central support element is located.

The at least one additional or alternative support element may advantageously be arranged in an edge region of the end face. Advantageously, the at least one additional or alternative support element can support the filter element with respect to the element axis in the axial, radial and/or circumferential direction against the corresponding additional housing supporting portion.

The at least one additional or alternative support element may advantageously be at least one web. The at least one additional or alternative support element may advantageously be elastic. It may thus also contribute to a tolerance compensation and/or vibration damping. The at least one additional or alternative support element may also be rigid.

In a further advantageous embodiment, at least one element side support element may be arranged on an end body, in particular an end plate, of the filter element.

Advantageously, the end body, in particular the end plate, may face the at least one support element of an inlet portion of space of the filter housing for air to be purified. The inlet portion of space may advantageously be connected with the at least one inlet. The at least one support element may be located on the raw air side of the filter medium.

The filter medium can be stabilized with the at least one end body. Further, the filter medium can be sealed at the end face with the at least one end body.

Advantageously, the at least one end body may be made of plastic or comprise plastic. It may advantageously be connected, in particular sealingly, with the end face of the filter medium by adhesion, welding or in another manner. The material of which the end body is comprised may advantageously also be foamed onto or foamed into the end face of the filter medium.

The at least one support element may advantageously be fixedly connected with the at least one end body. The at least one support element may be integrally connected with the at least one end body.

The at least one support element and the at least one end body may advantageously be realized integrally, in particular from plastic, or as a two-component unit.

Alternatively, the at least one support element may in particular be adhered, welded, foamed onto or connected in another fixed manner with the end body as a separate unit. The at least one support element may additionally or alternatively connected with the end body by means of an in particular mechanical connection, in particular a locking connection, a snap connection or in another manner. The at least one support element may be releasably or permanently connected with the end body.

Advantageously, a seal may be arranged between the filter element and the filter housing on the end face of the filter medium opposite the at least one support element. With the seal, the filter element can be sealed against the filter housing in the axial and/or radial direction.

The seal may further have a support function. Advantageously, the filter medium may be supported against the filter housing in the axial and/or radial direction by means of the seal. The seal may serve as a counter-bearing for the at least one support element in the axial direction. The filter element may thus be clamped between the seal and the at least one support element.

Advantageously, the seal may be made from or comprise an elastic material, in particular polyurethane, in particular a polyurethane foam, or another such material.

Advantageously, the seal may be connected with the filter element, in particular belong thereto. Advantageously, the seal may be connected with an end body, in particular an end plate, of the filter element. The seal may advantageously be integrally realized with the end body.

The seal may advantageously interact with the corresponding housing side sealing surface. The housing side sealing surface may advantageously be arranged in a housing container of the filter housing.

The technical object is further achieved by the filter housing in that at least one housing supporting portion is arranged on the side of the filter housing, which housing supporting portion, at least in the installed state of the at least one filter element in the filter housing, has a surface contour deviating from a flat surface on at least one end face which faces the filter element axially with respect to a housing axis, which housing axis extends parallel or axially to the element axis when the air filter is installed.

The features and advantages shown above in connection with the filter element according to the invention and its advantageous embodiments apply accordingly to the filter housing according to the invention and advantageous embodiments thereof.

Advantageously, the at least one housing supporting portion may extend in the axial direction with respect to the housing axis.

Advantageously, the at least one housing supporting portion may be cylindrical or conical. It may be coaxial with the housing axis.

The at least one housing supporting portion may have at least one groove on its end face which faces the filter element. An outer edge surrounding the groove may have the particular surface contour which deviates from a flat surface. An inner edge surrounded by the groove may have the same or a similar surface contour. Alternatively or in addition, the at least one element supporting portion may correspondingly have at least one groove.

Advantageously, the at least one housing supporting portion/element supporting portion may have an inner surface in its center, optionally surrounded by the inner edge. The inner surface may be axially set back or protrude forward from the particular surface contour of the possible outer edge and/or possible inner edge with respect to the housing axis/element axis.

On its axial end face, the filter element may have at least one element supporting portion, which has a negative contour of the at least one housing supporting portion. The two contours may engage in one another. They may realize an at least axial support.

Alternatively or in addition, the at least one housing supporting portion may advantageously have an end face which tapers axially to the housing axis and which may form the particular surface contour.

Alternatively or in addition, the particular surface contour can be negatively realized, i.e. as a depression, on the at least one housing supporting portion.

Advantageously, the at least one housing supporting portion may have a cone-shaped or pyramid-shaped projection. The cone-shaped or pyramid-shaped housing supporting portion may advantageously engage in a corresponding cone-shaped or pyramid-shaped recess or depression of the corresponding element supporting portion of the filter element. Conversely, the element supporting portion may have the cone-shaped or pyramid-shaped projection and the housing supporting portion may have the corresponding recess or depression.

Instead of a cone-shaped or pyramid-shaped depression and/or recess, the element supporting portion/housing supporting portion may also be realized with cross-like portions similar to Philips screws or Pozidriv screws.

Advantageously, different, in particular the above-mentioned, surface contours of the end faces of the at least one housing supporting portion and/or the at least one element supporting portion can be combined with one another. In particular, the inner edge of the groove of the at least one housing supporting portion/element supporting portion may pass into the inner surface. A supporting can occur both on the support contour of the groove as well as the inner surface.

Advantageously, the filter housing may be composed of at least two housing parts. The two housing parts may advantageously be completely or partially separated from one another for opening the filter housing. One of the housing parts may in particular be a housing container. The at least one filter element can in particular be accommodated for the most part in the housing container. The housing container may advantageously be coaxial to the housing axis. It may advantageously have an installation opening, which is coaxial with the housing axis, for the at least one filter element. The at least one filter element can thus be installed easily into the housing container through the installation opening in the axial direction with respect to the housing axis. Another housing part may advantageously be a housing cover. The installation opening of the housing container, and thus the filter housing, may be closed with the housing cover. The at least one inlet and the at least one outlet may be located in the same or in different housing parts. Advantageously, an in particular smaller portion of the at least one filter element may protrude into the housing cover.

The at least one housing supporting portion may advantageously be located on one of the housing parts. Advantageously, the at least one housing supporting portion may be located on the housing cover. The positioning of the at least one filter element and/or the assembly of the at least one element side support element can thus be simplified by means of the at least one housing supporting portion.

Advantageously, at least one housing supporting portion may be arranged centrally to the housing axis, in particular axial or coaxial with the housing axis. This housing supporting portion may optionally easily interact with a corresponding centrally arranged element side support element.

Advantageously, the filter element may be supported on the other housing part, in particular the housing container, on the end face opposite the at least one support element.

Advantageously, the at least one housing supporting portion may be a sort of pillar or dome, or may comprise these or be a part thereof. The at least one housing supporting portion may be located on the free end of the pillar. With the other end, the pillar or dome can be connected with the filter housing, in particular the housing cover. It may in particular be integrally connected to the filter housing. The pillar or dome may advantageously be hollow. In this way, material and weight can be saved. Further, a hollow pillar or dome can be simply realized and/or unmolded after a molding process, in particular from plastic.

The pillar or dome may advantageously extend through a portion of space of the filter housing. In this way, the at least one filter element may be supported at a distance from a corresponding housing wall of the filter housing, in particular the housing cover, spanned by the pillar or dome. Advantageously, the portion of space may be flowed through by air during operation of the air filter. Depending on the direction of flow of the air in the filter housing, the portion of space may be an inlet portion of space or an outlet portion of space.

Advantageously, a plurality of counter-support portions may be arranged on the side of the filter housing. The counter-support portions may advantageously be associated with corresponding support elements on the side of the at least one filter element.

The technical object is additionally achieved by the air filter according to the invention in that it has at least one filter element according to the invention and/or one filter housing according to the invention.

The features and advantages shown above in connection with the filter element according to the invention and the filter housing according to the invention and its respective advantageous embodiments apply accordingly to the air filter according to the invention and advantageous embodiments thereof.

Advantageously, the at least one support element and the at least one counter-support portion may be arranged on a raw air side of the at least one filter element.

A gap may advantageously be realized between the at least one filter element in the region of the end face with the at least one support element and an inner wall of the filter housing which radially outwardly surrounds the at least one filter element. By means of the gap, air may flow into or out of the space which radially outwardly surrounds the filter element. A stream of air may thus flow, in particular axially to the element axis, from an inlet portion of space of the filter housing to the inflow side of the filter medium. Depending on the direction of flow, the upstream side of the filter medium may be located in the element interior or on the radially outer circumferential side of the at least one filter element. Accordingly, the air stream may flow axially to the element axis from the upstream side of the filter medium into a corresponding outlet portion of space of the filter housing. By means of the axial flow of air, an improved packing size of the filter housing, and thus a smaller footprint, can be realized. Further, in an axial flow of air to the upstream side and/or away from the downstream side, a pressure difference between the upstream side and downstream side can be reduced. Thus, in particular a lower pressure difference can be realized than in a comparable air filter in which the flow of air is led tangentially to the upstream side of the at least one filter element or away from the downstream side.

Advantageously, an inlet-side inlet portion of space, and element portion of space, in which the at least one filter element is arranged, and an outlet-side outlet portion of space of the filter housing can be arranged one after the other, linearly and along the direction of flow of the air through the air filter. In this way, an axial flow of the air to the upstream side of the filter medium can easily be realized. Further, an axial discharge of the filtered air from the clean air side of the at least one filter element can thus be achieved. Any differences in pressure between the clean air side and the raw air side can thus be reduced.

Advantageously, a main flow direction of the air from the inlet portion of space through the element portion of space into the outlet portion of space may be substantially axial to the element axis.

BRIEF DESCRIPTION OF THE DRAWINGS

Further advantages, features and details of the invention will become apparent from the following description in which embodiments of the invention are explained in more detail with reference to the drawings. A person skilled in the art will also appropriately consider the features disclosed in the drawings, the description and the claims individually and combine them into further sensible combinations.

FIGS. 8 to 14 show isometric representations of alternative embodiments of round filter elements which are similar to the round filter element according to the first embodiment of FIGS. 1 to 6.

In the figures, identical components are provided with the same reference characters.

DESCRIPTION OF THE INVENTION

Figure 1:
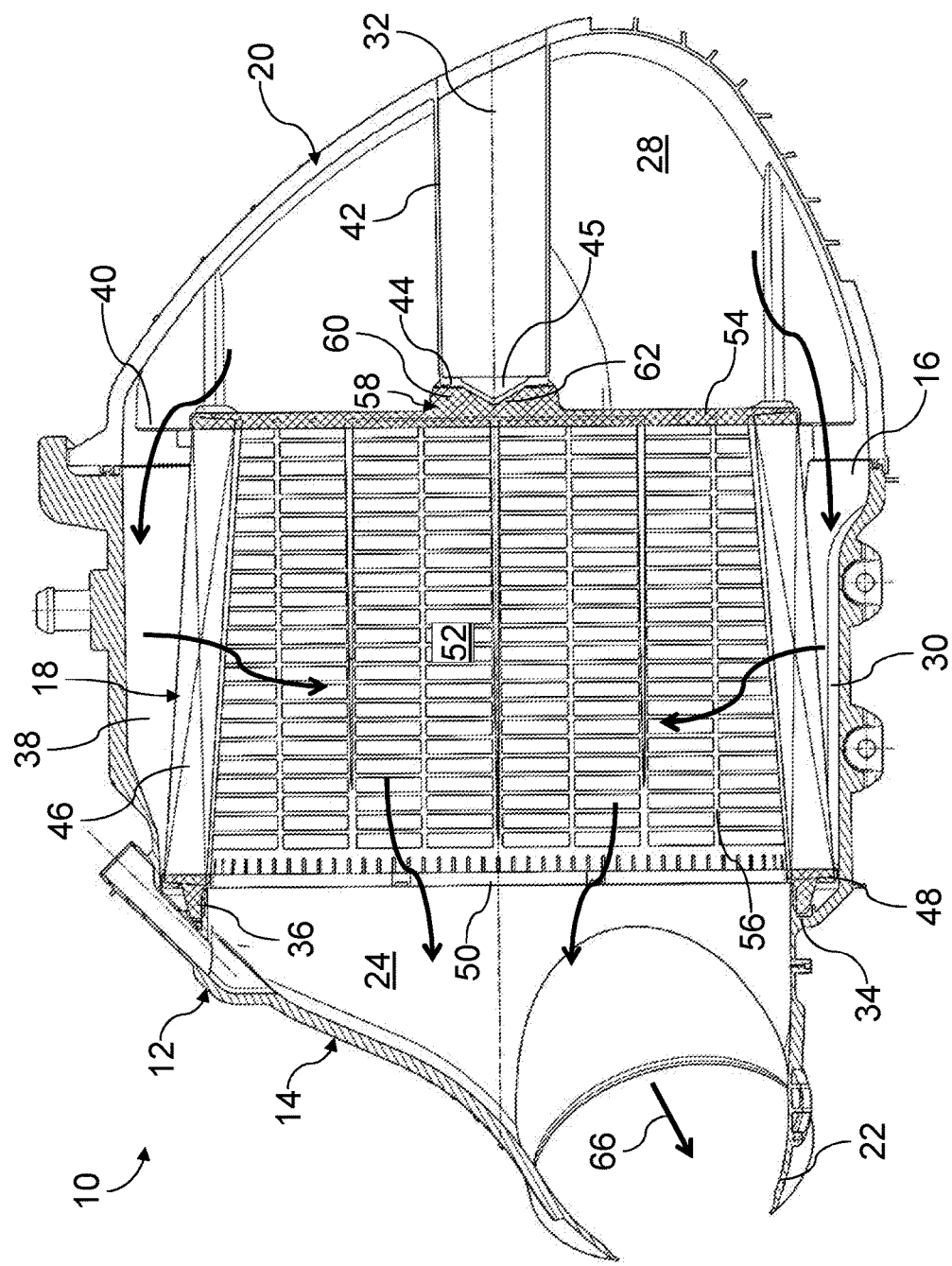
FIG. 1 shows a first longitudinal section of an air filter of an internal combustion engine of a commercial vehicle with a replaceable flat oval round filter element according to a first embodiment.

In FIG. 1 is shown an air filter 10 of an internal combustion engine of a commercial vehicle according to a first embodiment in a first longitudinal section. The air filter 10 is arranged in an air intake tract, not otherwise shown, of the internal combustion engine. It is used for the purifying of combustion air which is supplied to the internal combustion engine for combustion.

Figure 2:
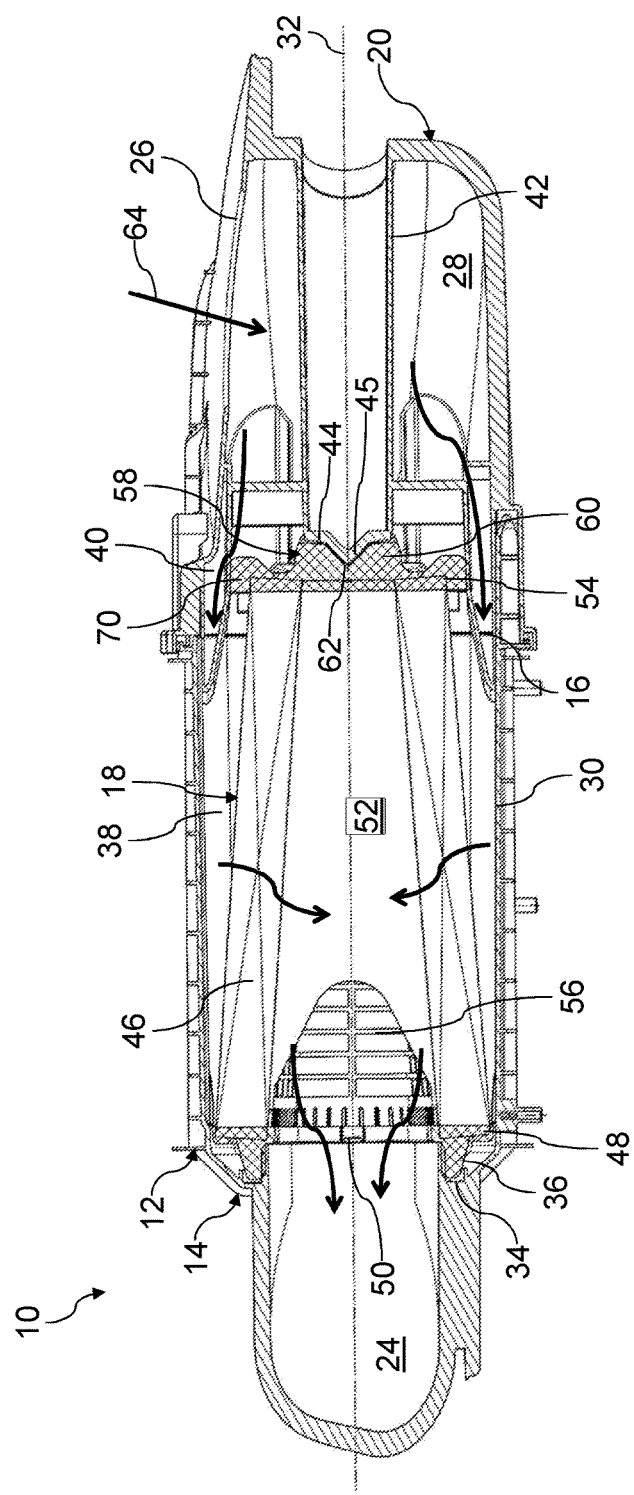
FIG. 2 shows a second longitudinal section of the air filter of FIG. 1 along a sectional plane perpendicular to the sectional plane of FIG. 1.

The air filter 10 includes an openable filter housing 12. The filter housing 12 is flat-oval. With respect to an oval filter housing with an approximately elliptical cross-section, the filter housing 12 is flattened in the direction of its short transverse axis. FIG. 1 shows the section along a long transverse axis of the filter housing 12. FIG. 2 shows the air filter 10 in a second longitudinal section along a short transverse axis of the filter housing 12.

Figure 6:
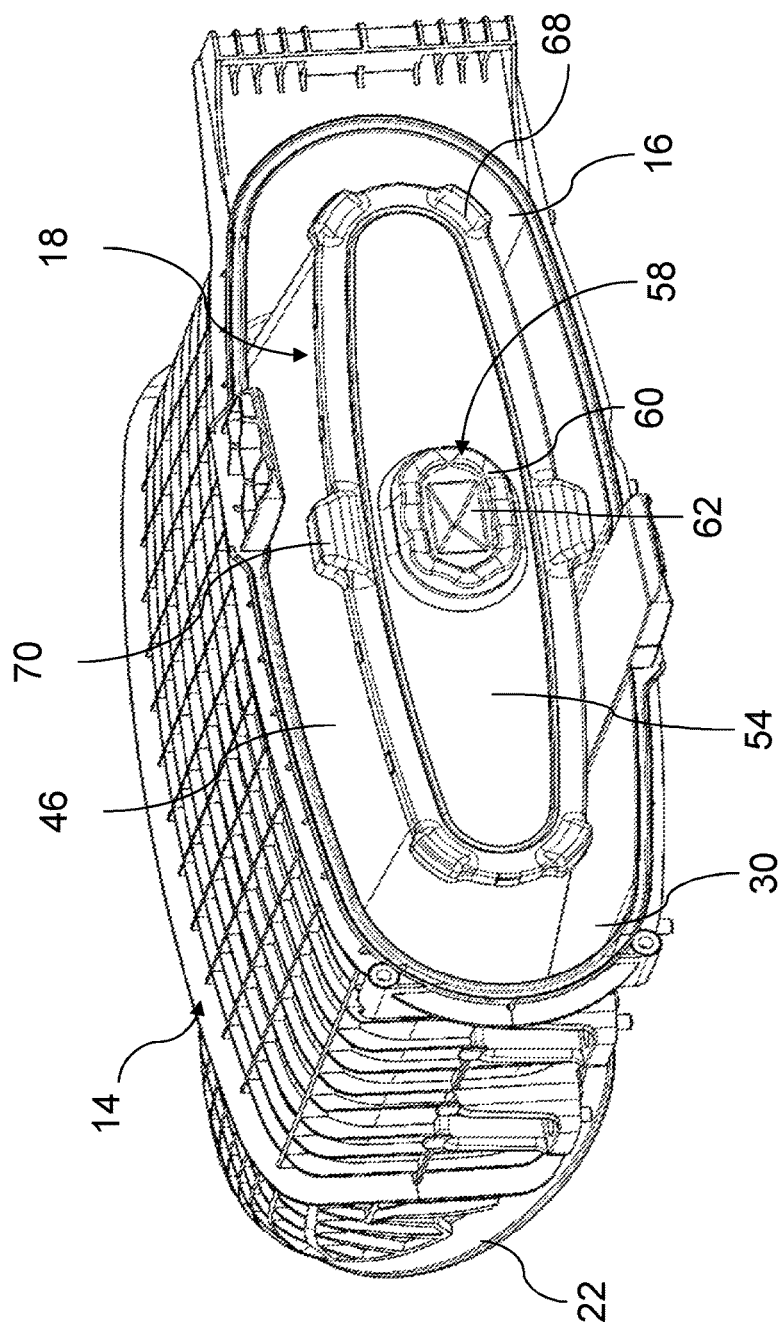
FIG. 6 shows an isometric representation of the open housing container of the air filter of FIGS. 1 and 2 with the round filter element.
Figure 7:
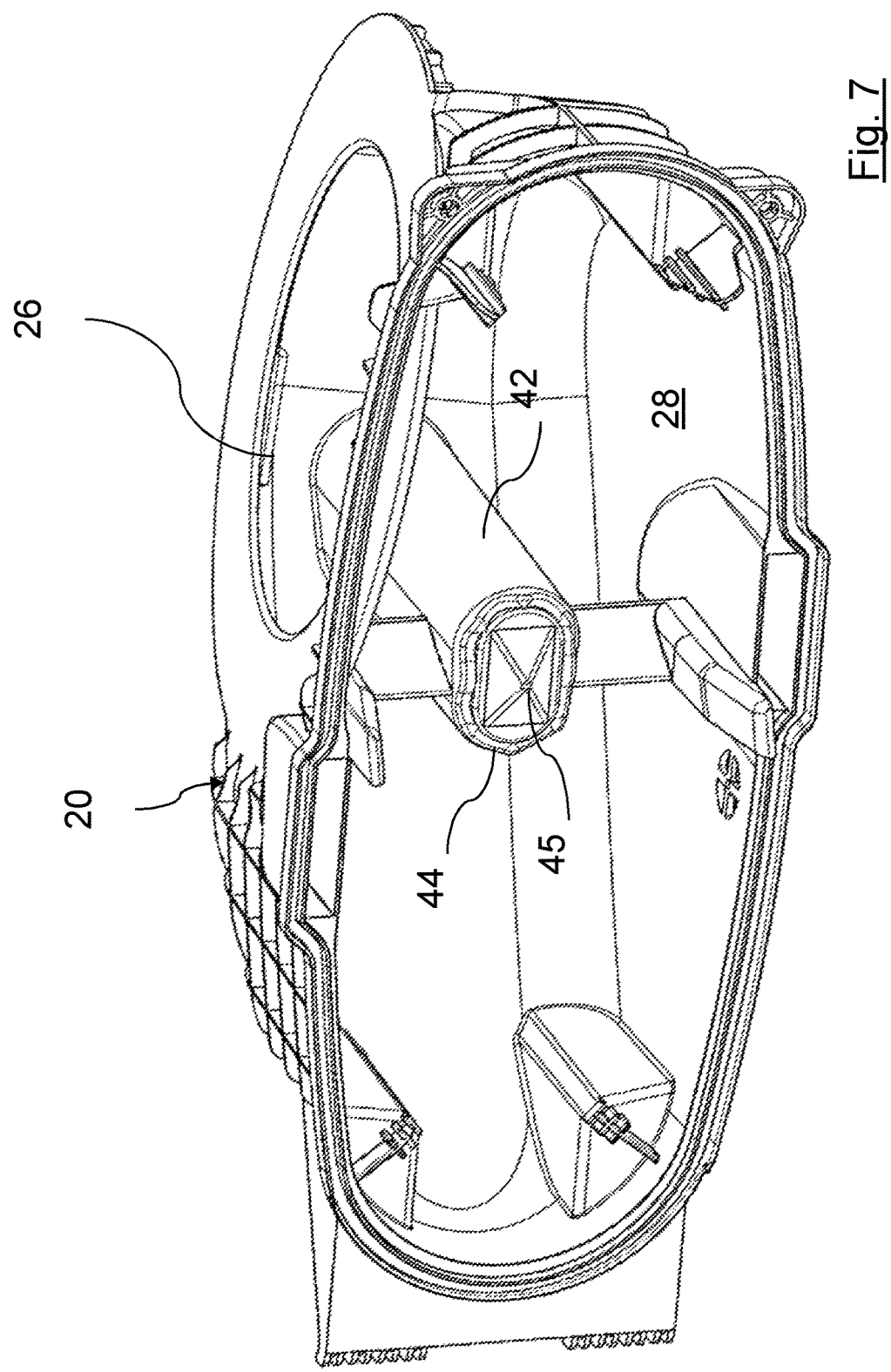
FIG. 7 shows an isometric representation of a housing cover of the air filter of FIGS. 1 and 2.

The filter housing 12 has a housing container 14, to the left in FIGS. 1 and 2. The housing container 14 has an installation opening 16, to the right in FIGS. 1 and 2, for installation of a filter element 18. The open housing container 14 with the filter element 18 is shown in FIG. 6. When the air filter 10 is ready to operate, the installation opening 16 is closed with the housing cover 20, to the right in FIGS. 1 and 2. The housing cover 20 alone is shown in FIG. 7.

The housing container 14 has an outlet 22 for filtered air, which leads out of an outlet portion of space 24 of the housing container 14. The outlet 22 is connected outside the filter housing 12 with the internal combustion engine via air lines, not shown.

The housing cover 20 has an inlet 26 for air to be filtered, which opens into an inlet portion of space 28 of the housing cover 20 and which is connected with the environment outside the filter housing 12.

The filter element 18 is arranged in an element portion of space 30 of the housing container 14 such that it separates the inlet 26 from the outlet 22. The element portion of space 30 is located in a linear arrangement between the inlet portion of space 28 and the outlet portion of space 24.

The inlet portion of space 28, the element portion of space 30 and the outlet portion of space 24 are arranged one after the other axially to an axis 32. In the embodiment, the axis 32 coincides with a housing axis of the filter housing 12 and with an element axis of the installed filter element 18. In the embodiment, the axis 32 further coincides with an installation direction, in which the filter element 18 is inserted into and can be removed from the housing container 14. In addition, the axis 32 coincides in the embodiment with an assembly direction, in which the housing cover 20 is assembled on the housing cover 14. The installation opening 16 circumferentially surrounds the axis 32.

When further reference is made to "axial," "radial," "circumferential" or "coaxial", this refers unless otherwise written to the axis 32.

The housing container 14 has a circumferentially closed sealing surface 34 axially between the element portion of space 30 and the outlet portion of space 24. The sealing surface 34 extends in the radial direction. The sealing surface 34 faces the housing cover 20. A seal 36 of the filter element 18 is sealingly applied to the sealing surface 34 in a circumferentially closed manner.

The radially inner cross-section of the element portion of space 30 is larger than a radially outer cross-section of the sealing surface 34.

An upstream annular space 38 is realized between a radially outer circumferential side of the filter element 18 and the radially inner circumferential side of the element portion of space 30. The upstream annular space 38 is separated by means of the seal 36 from the outlet portion of space 24.

The upstream annular space 38 is connected with the inlet portion of space 28 on the side facing the housing cover 20 by means of a circumferential gap 40. The inlet portion of space 28 and the upstream annular space 38 are located on the raw air side of the filter element 18.

A support pillar 42 is arranged in the housing cover 20. The support pillar 42 is integrally connected with the housing cover 20. The support pillar 42 is coaxial with the axis 32, i.e. coaxial with the housing axis. It is arranged centrally with respect to the housing axis. The support pillar 42 extends through the inlet portion of space 28 from an inner side of the housing cover 20 facing the filter element 18 up to the outlet-side end face of the filter element 18. The support pillar 42 is located on the raw air side of the filter medium 46.

At the free end of the support pillar 42 which faces the filter element 18 is arranged a housing supporting portion 44 which extends circumferentially and is radially outward from a major axis of the support pillar 42, thus to the axis 32 and to the housing axis. In an axial plan view, the radially outer housing supporting portion 44 has the shape of an oval, circumferentially closed path. The long transverse axis of the oval is located in the drawing plane of FIG. 1, the short transverse axis is perpendicular to the drawing plane thereof. An end face of the radially outer housing supporting portion 44 which faces the filter element 18 has a surface contour which deviates from a flat surface and which is wave-like when viewed from the side.

Radially inside the radially outer housing supporting portion 44, the free end of the support pillar 42 has a central, pyramid-shaped, radially inner housing supporting portion 45 on its end face. The tip of the right pyramid is located on the axis 32 and faces the filter element 18. The height axis of the pyramid extends coaxially with the axis 32. The pyramid has a rectangular base surface. The long side of the base surface extends parallel to the long transverse axis of the radially outer housing supporting portion 44. The four side surfaces of the pyramid form the end face of the radially inner housing supporting portion 45 which faces the filter element 18. The end face of the radially inner housing supporting portion 45 thus has a surface contour which deviates from a flat surface.

Figure 3:
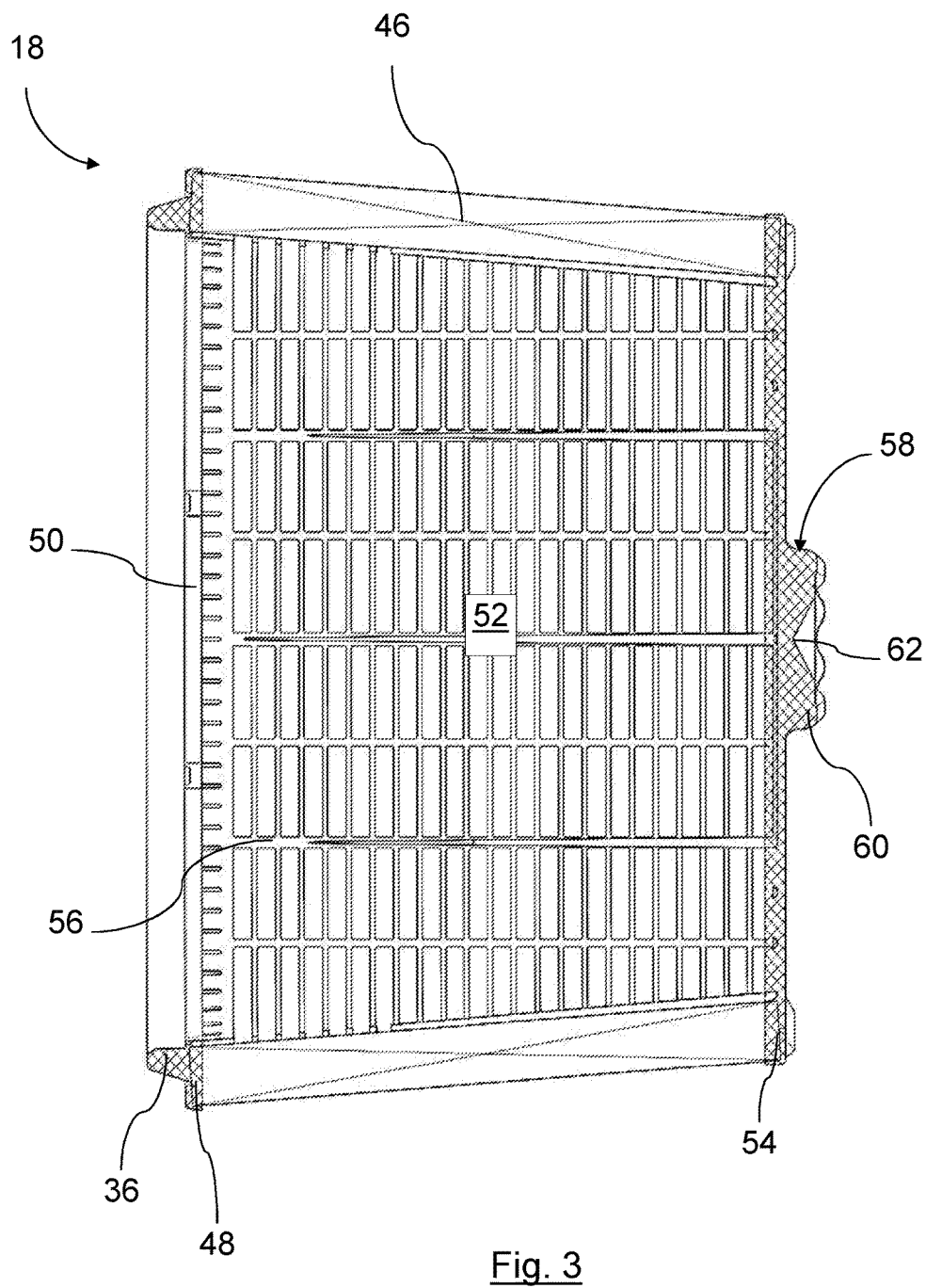
FIG. 3 shows the round filter element in the longitudinal section of FIG. 1.
Figure 4:
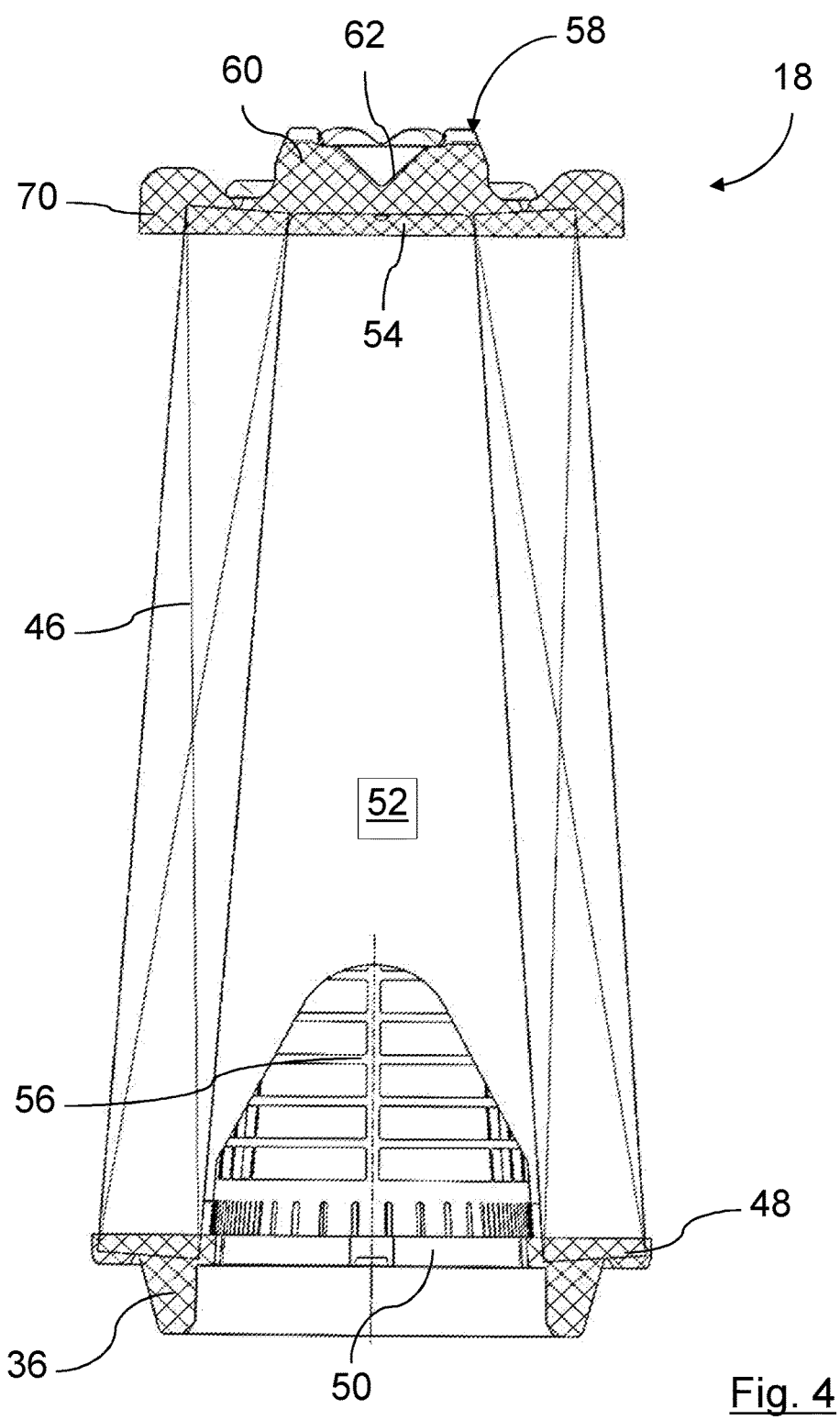
FIG. 4 shows the round filter element in the longitudinal section of FIG. 2.
Figure 5:
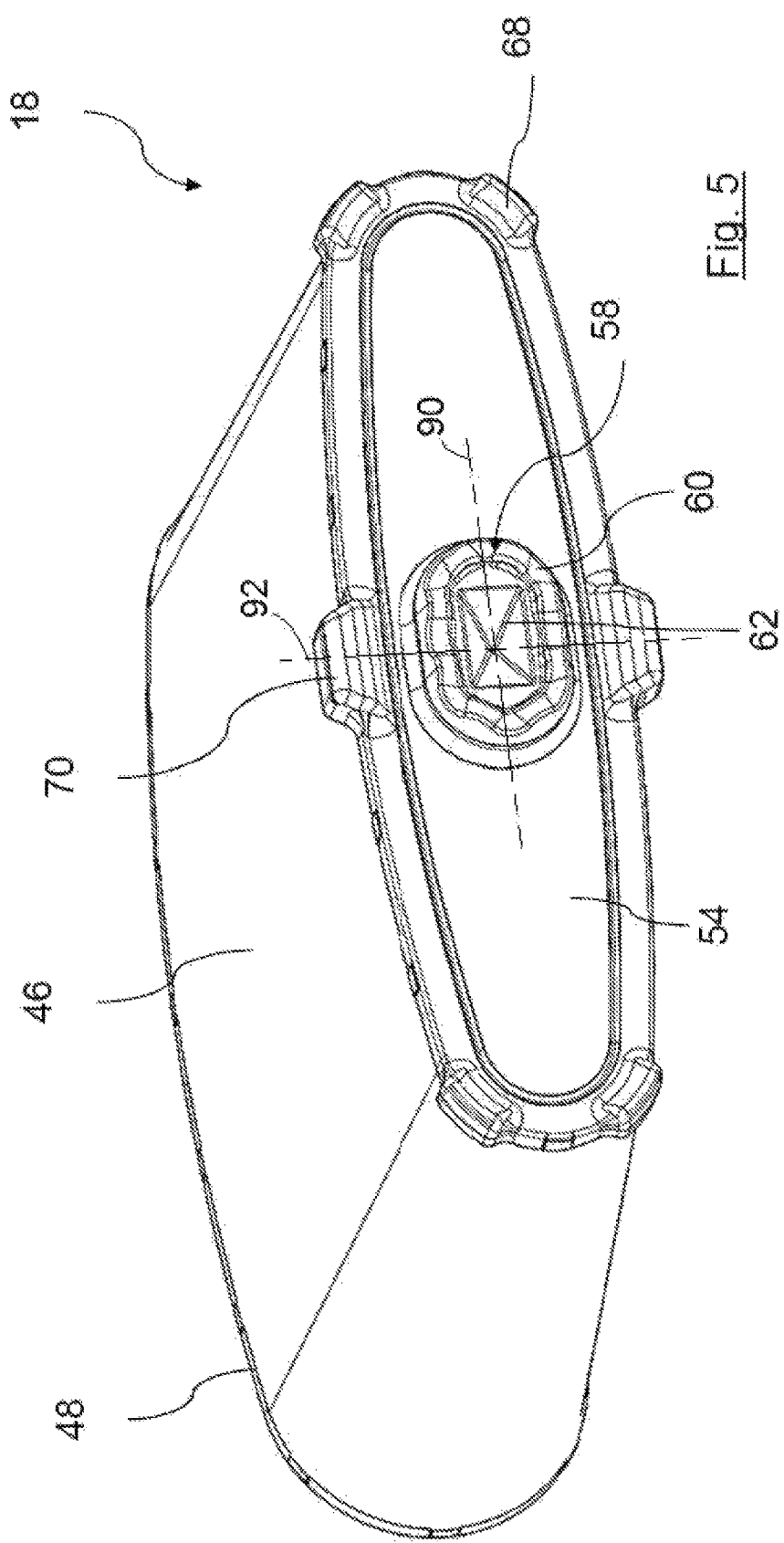
FIG. 5 shows an isometric representation of the round filter element of FIGS. 1 to 4.

The filter element 18 is shown in FIGS. 3 to 5 in various detail views. The filter element 18 is a conical flat oval round filter element. The filter element 18 is coaxial with the element axis, thus coaxial in the installed state with the housing axis, thus with axis 32. The filter element 18 has a flat oval cross-section. The long transverse axis of the oval is located in the drawing plane of FIG. 1, the short transverse axis is perpendicular to the drawing plane. The filter element 18 is additionally flattened in the direction of the short transverse axis, thus the designation "flat oval." In contrast, "oval" designates an approximately elliptical cross-section. A radially outer circumferential side and a radially inner circumferential side of the filter element 18 respectively have a conical extent. The outer cross-section and the inner cross-section of the filter element 18 are tapered from the outlet-side end face, which faces the outlet portion of space 24, to the inlet-side end face.

The filter element 18 comprises a zigzag-shaped, folded filter medium 46 which is circumferentially closed with respect to the element axis. The radially inner folded edges and the radially outer folded edges respectively form the corresponding circumferential sides of the filter element 18. The filter medium 46 is a non-woven filter which is suitable for the filtration of air. Additionally or alternatively, a different type of filter medium suitable for filtration, for example filter paper, can be provided. The filter medium 46 may be one or more layers.

The filter medium 46 is connected on its outlet-side end face with a coaxial outlet-side end plate 48. The outlet-side end plate 48 is made of plastic. It is tightly bonded to the end face of the filter medium 46. It may also be connected in a different manner with the filter medium 46. For example, it may also be welded or foamed thereon or therein. The radially outer circumferential side of the outlet-side end plate 48 abuts the radially inner circumferential side of the housing container 14 with minimal play.

The outlet-side end plate 48 has a central outflow opening 50. The outflow opening 50 extends over the entire radially inner cross-section of the filter medium 46. An element interior 52 of the filter element 18, which is surrounded by the filter medium 46, is connected with the outlet portion of space 24 via the outflow opening 50.

The seal 36 is arranged on the outer side of the outlet-side end plate 48 axially opposite the filter medium 46. The seal 36 is made of elastic polyurethane foam. It is, for example, integrally foamed onto the outlet-side end plate 48. Instead of polyurethane foam, the seal 36 can be made of another, preferably elastic, material, such as a plastic. Instead of being foamed on, it may be connected in a different manner to the outlet-side end plate 48. The outlet-side end plate and the seal can also be realized as a two-component unit.

The seal 36 is coaxial with the element axis and circumferentially surrounds the outflow opening 50. It extends in the axial direction. It is supported in the axial direction on the sealing surface 34 of the housing container 14.

The filter medium 46 is sealingly connected on its inlet-side end face with an inlet-side end plate 54. The inlet-side end plate 54 closes the element interior 52 from the inlet portion of space 28. In a similar manner to the outlet-side end plate 48, the inlet-side end plate 54 is sealingly connected with the filter medium 46. It may also be connected in a different manner with the filter medium 46.

A coaxial support tube 56 extends in the element interior 52 between the inlet-side end plate 54 and the outlet-side end plate 48. The support tube 56 is made of plastic. It is structured as a grid. Its circumferential side is permeable to air. The support tube 56 has a conical flat oval shape corresponding to the filter medium 46. The radially inner circumferential side of the filter medium 46 may be supported on the radially outer circumferential side of the support tube 56.

An element-side support element 58 is arranged on the axially outer side of the inlet-side end plate 54 facing the element interior 52. The support element 58 is located on the raw air side of the filter medium 46. The support element 58 is fixedly connected to the inlet-side end plate 54. The support element 58 is made of an elastic material. In the embodiment shown, the support element 58 is integrally foamed from polyurethane with the inlet-side end plate 54.

Radially outwardly, the support element 58 has the form of a cylinder, the major axis of which extends coaxial with the element axis in the embodiment shown. The support element 58 has an approximately oval cross-section. In FIG. 1, its short transverse axis is in the drawing plane, its long transverse axis is perpendicular to the drawing plane. When an air filter 10 is installed, the orientation of the support element 58 with respect to the axis 32, thus the housing axis, thus corresponds to the orientation of the housing supporting portions 44 and 45.

Radially outwardly, the support element 58 has a radially outer coaxial element supporting portion 60. An end face of the radially outer element supporting portion 60 which faces away from the element interior 52 has the shape of an oval path in an axial plan view. The end face of the radially outer element supporting portion 60 has a wave-shaped surface contour which deviates from a flat surface when regarded from the side.

The end face of the radially outer element supporting portion 60 is complementary to the end face of the radially outer housing supporting portion 44. The dimensions of the radially outer element supporting portion 60 correspond approximately to the dimensions of the radially outer housing supporting portion 44.

Radially within the radially outer element supporting portion 60, the support element 58 has a central, radially inner element supporting portion 62. The radially inner element supporting portion 62 is circumferentially closed and surrounded by the radially outer element supporting portion 60. The radially inner element supporting portion has the shape of a pyramid-shaped depression. The tip of the right pyramid is located on the axis 32 and faces the element interior 52. The height axis of the pyramid extends coaxially with the axis 32. The pyramid has a rectangular base surface. The long side of the base surface extends parallel to the long transverse axis of the radially outer element supporting portion 60. The four side surfaces of the pyramid form the end face of the radially inner element supporting portion 62 which faces away from the element interior 52. The end face of the radially inner element supporting portion 62 thereby has a surface contour which deviates from a flat surface. It is complementary to the end face of the radially inner housing supporting portion 45.

As is shown in FIGS. 1 and 2, when the filter element 18 is correctly installed, the end face of the radially inner housing supporting portion 45 lies flat and without play against the end face of the radially inner element supporting portion 62. The end face of the radially outer housing supporting portion 44 lies flat and without play against the end face of the radially outer element supporting portion 60. Here, the housing supporting portions 44 and 45 engage in a form locking manner in the respective element supporting portions 60 and 62, and vice versa. The element supporting portions 60 and 62 and the housing supporting portions 44 and 45 respectively form element-side and housing-side form locking portions for form locking connection of the support element 58, thus the filter element 18, with the support pillar 42, thus the filter housing 12.

The filter element 18 is supported via the support pillar 42 against the housing cover 20 by means of the support element 48. The support occurs axially, radially, thus transverse to the element axis and to the housing axis, and circumferentially. Through the interaction of the support element 48 with the support pillar 42, the filter element 18 is held and positioned axially, radially and circumferentially on the inlet side, i.e. the raw air side. The filter element 18 can thus be held in the filter housing 12 on the side facing the inlet portion of space 28, without covering the gap 40 by the necessary holding components.

Further, two support webs 68 are respectively arranged on the radially outer edges of the inlet-side end plate 54 in the region of the short transverse sides. The support webs 68 respectively project beyond the outlet-side end plate 54 both in the radial direction and in the axial direction. The support webs 68 are respectively supported in the radial direction at support points on the inner side of the housing container 20.

On the radially outer edges of the inlet-side end plate 54, a respective guide element 70 is arranged centrally on the long transverse sides, with which the filter element 18 can be guided and positioned on the housing cover 20 during assembly of the air filter 10 in a manner of no further interest here.

During operation of the air filter 10, the air to be filtered flows through the inlet 26, indicated in FIG. 2 by an arrow 64, into the inlet portion of space 28. From there, the air passes substantially axially through the gap 40 into the upstream annular space 38 to the upstream side of the filter medium 46. The air flows through the filter medium 46 from radially outside to radially inside and is purified. The purified air flows through the circumferential side of the support tube 56 and passes into the element interior 52. The purified air leaves the element interior 52 with an axial primary flow direction and enters the outlet portion of space 24. From there, the filtered air exits the filter housing 12 through the outlet 22, indicated in FIG. 1 by an arrow 66.

For maintenance purposes, for example for maintenance or replacement of the filter element 18, the filter housing 12 can be opened. For this purpose, the housing cover 20 is removed in the axial direction from the housing cover 14. Here, the support element 58 is automatically separated from the support pillar 42. The filter element 18 is pulled out of the element portion of space 30 of the housing container 14 in the axial direction. It may be replaced by a new filter element 18 or may be reinstalled after cleaning.

For installation, the filter element 18 is advanced in the axial direction in the housing container 14 with the outlet-side end plate 48 forward, until the seal 36 abuts the sealing surface 34. Subsequently, the housing cover 20 is placed with its open side forward in the axial direction onto the installation opening 16 of the housing container 14. Here, the support element 58 is brought into relationship with the support pillar 42.

Alternative embodiments of the filter element 18 are shown in FIGS. 8 to 14. Those elements which are similar to those of the first embodiment of FIGS. 1 to 7 are denoted by the same reference characters. The alternative embodiments differ from the first embodiment by the configuration of the element-side support element 58.

Figure 8:
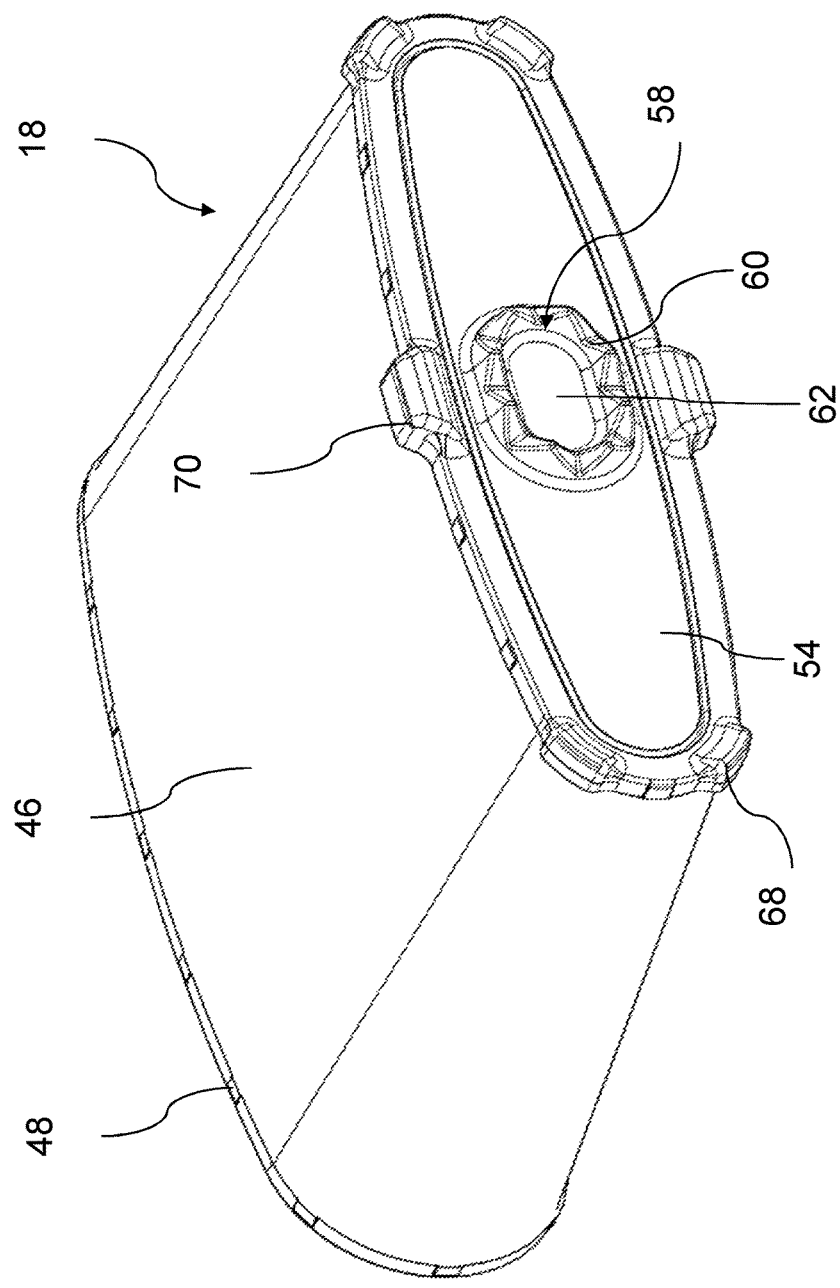

In the second embodiment of FIG. 8, the end face of the radially outer element supporting portion 60 has a zigzag-shaped surface contour. The radially inner element supporting portion 62 is configured as a flat surface.

Figure 9:
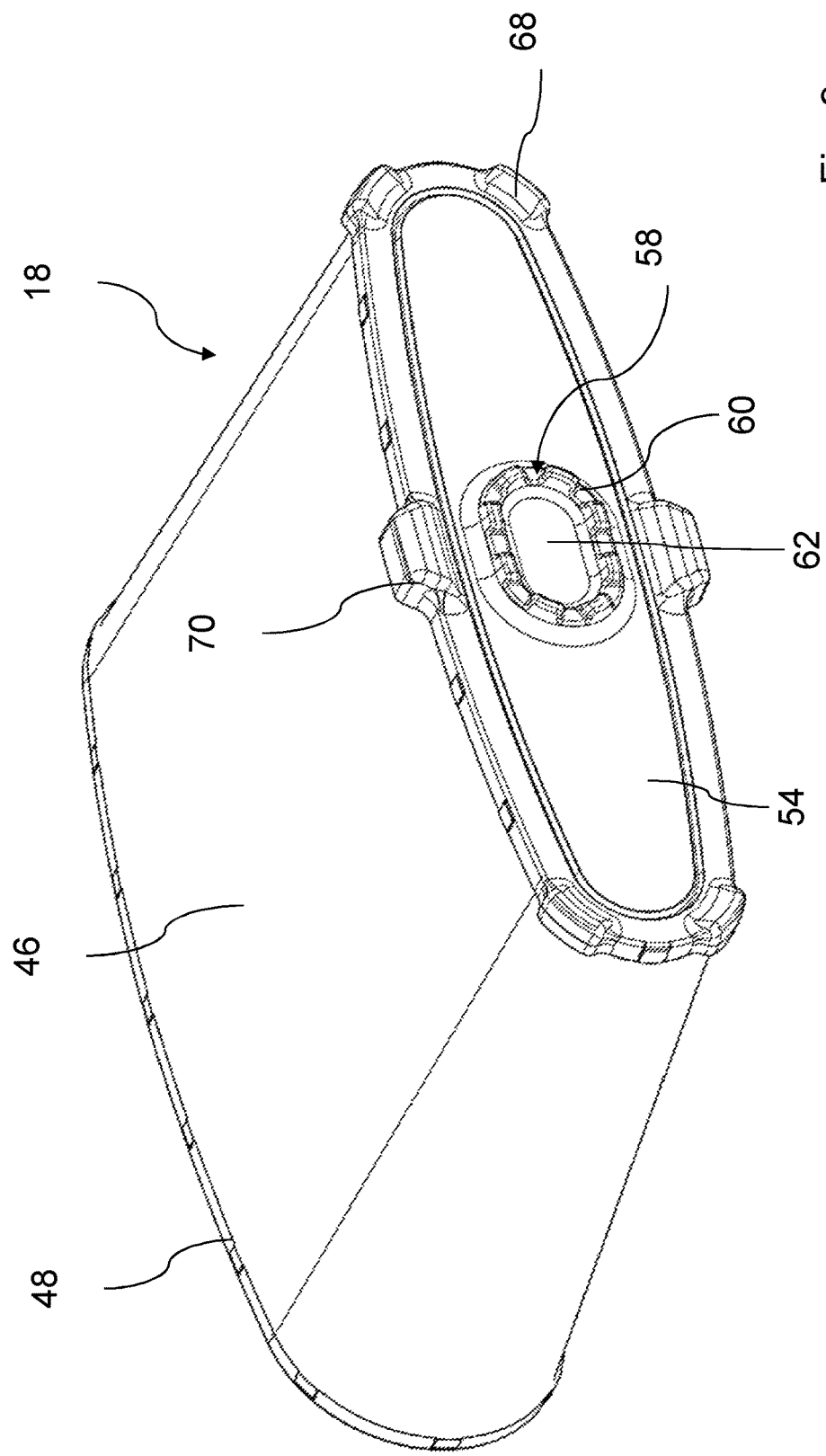

In the third embodiment of FIG. 9, the end face of the radially outer element supporting portion 60 has a step-shaped surface contour. The radially inner element supporting portion 62 is configured as a flat surface.

Figure 10:
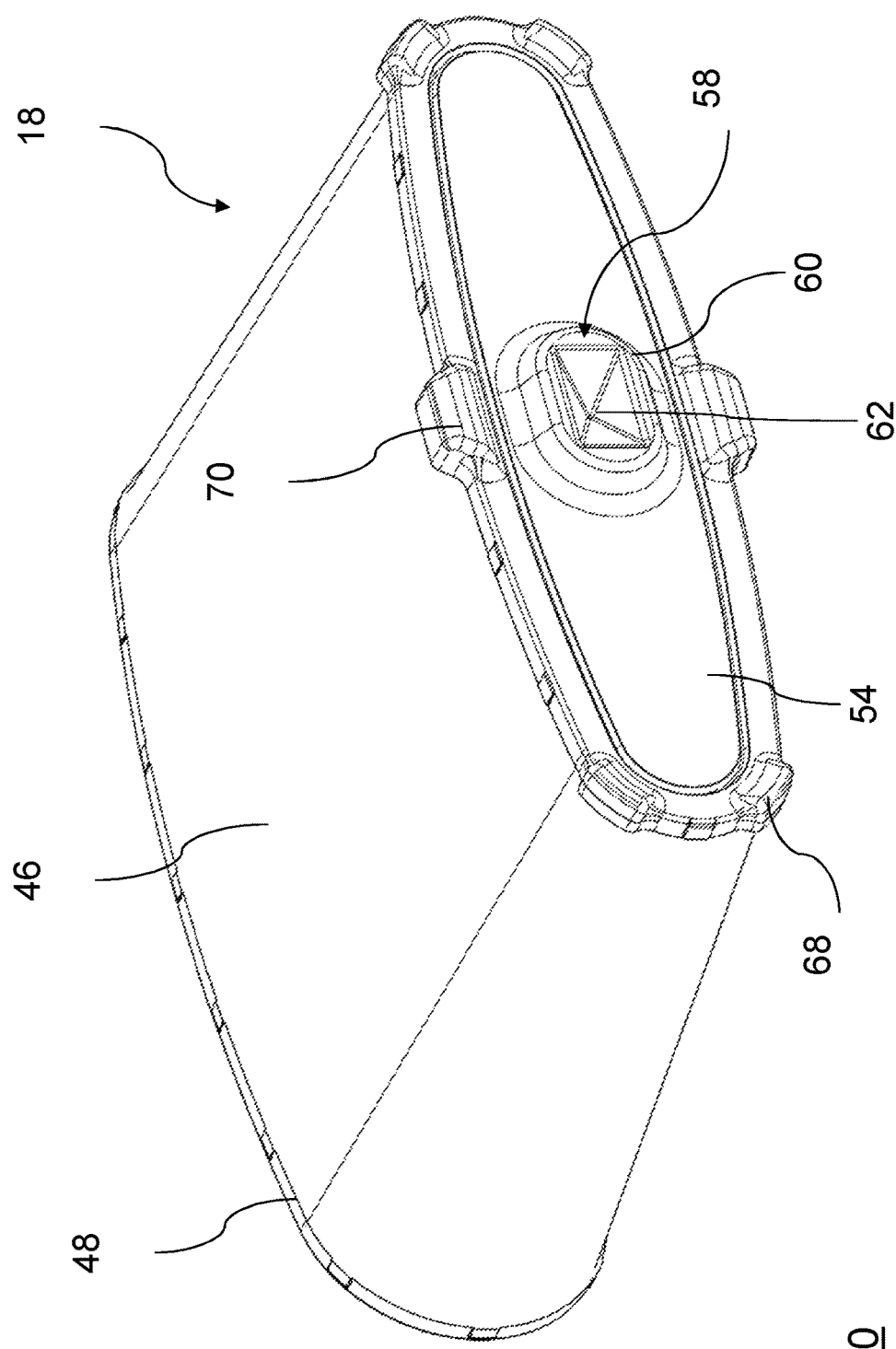

In the fourth embodiment of FIG. 10, the end face of the radially outer element supporting portion 60 has a bulge-like surface contour. As in the first embodiment, the radially inner element supporting portion 62 is formed as a pyramid-shaped depression.

Figure 11:
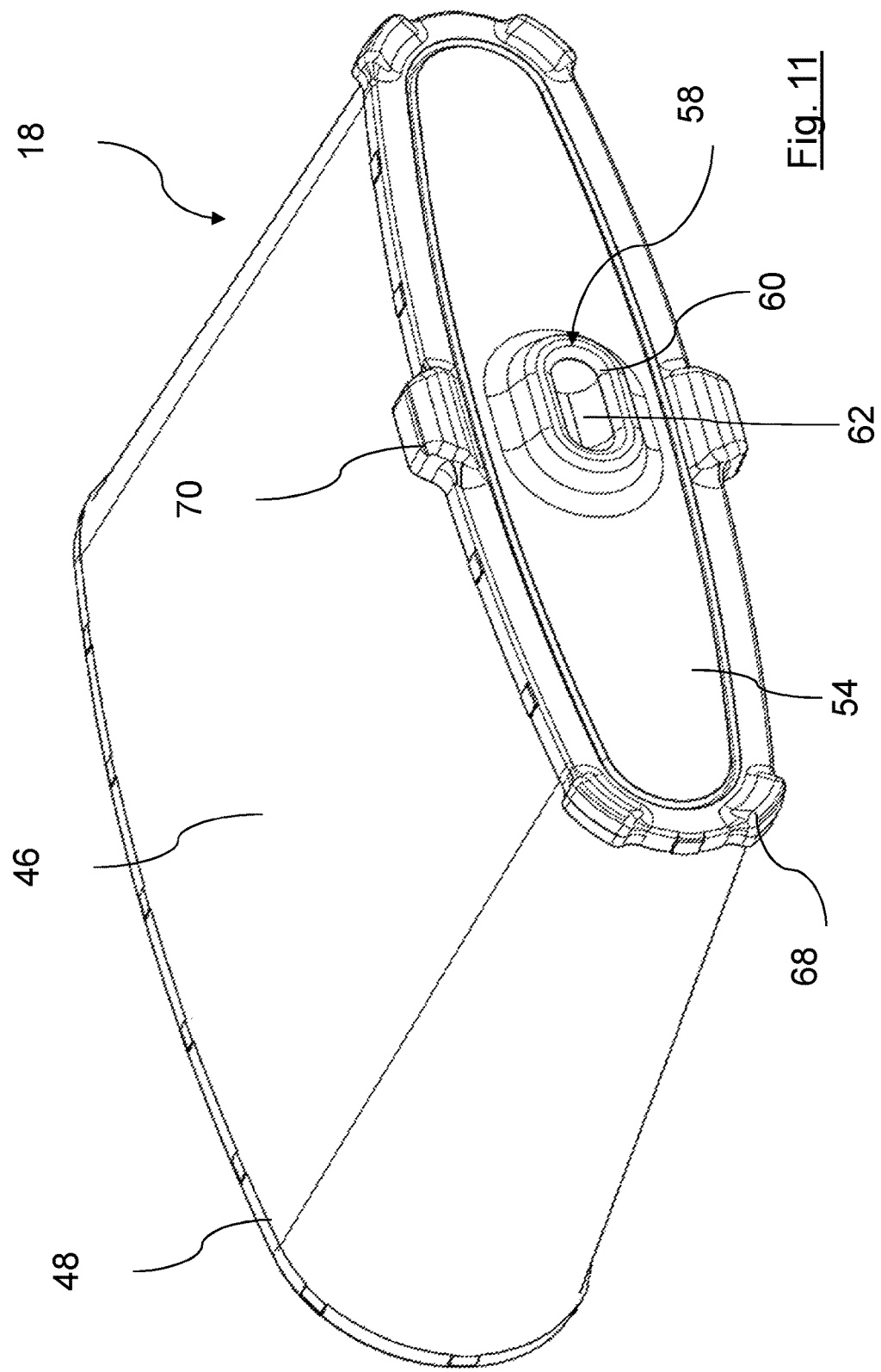

In the fifth embodiment of FIG. 11, the end face of the radially outer element supporting portion 60 has a bulge-like surface contour. The radially inner element supporting portion 62 is configured as a depression similar to the profile of the lateral surface of a half circular-cylinder with rounded end edges.

Figure 12:
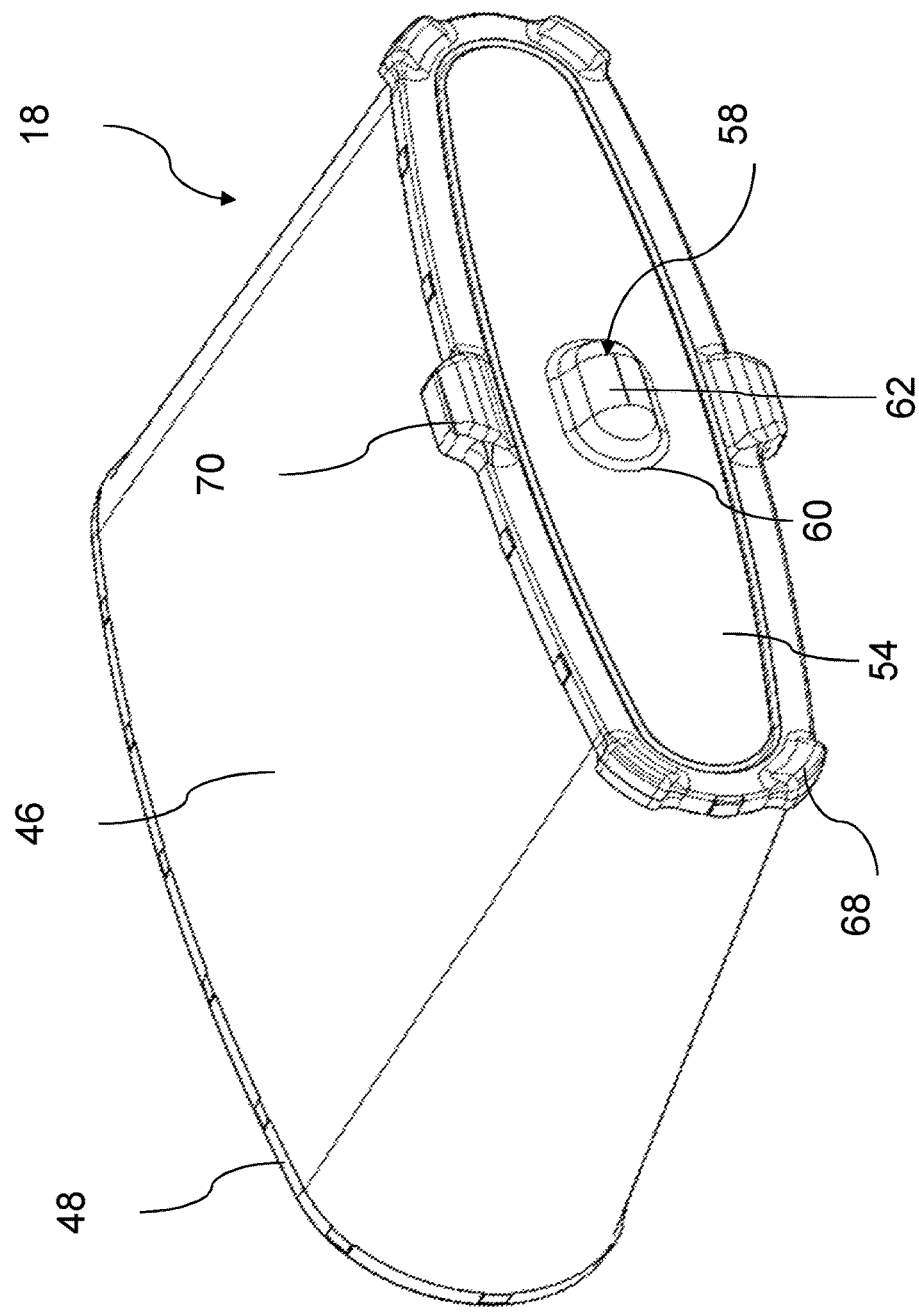

In the sixth embodiment of FIG. 12, the end face of the radially outer element supporting portion 60 extends as a flank which is inclined with respect to the element axis and gradually transitions into the radially inner element supporting portion 62. The radially inner element supporting portion 62 is configured as an elevation. The end face of the radially inner element supporting portion 62 has a surface contour similar to the profile of a half circular-cylinder with rounded edges.

Figure 13:
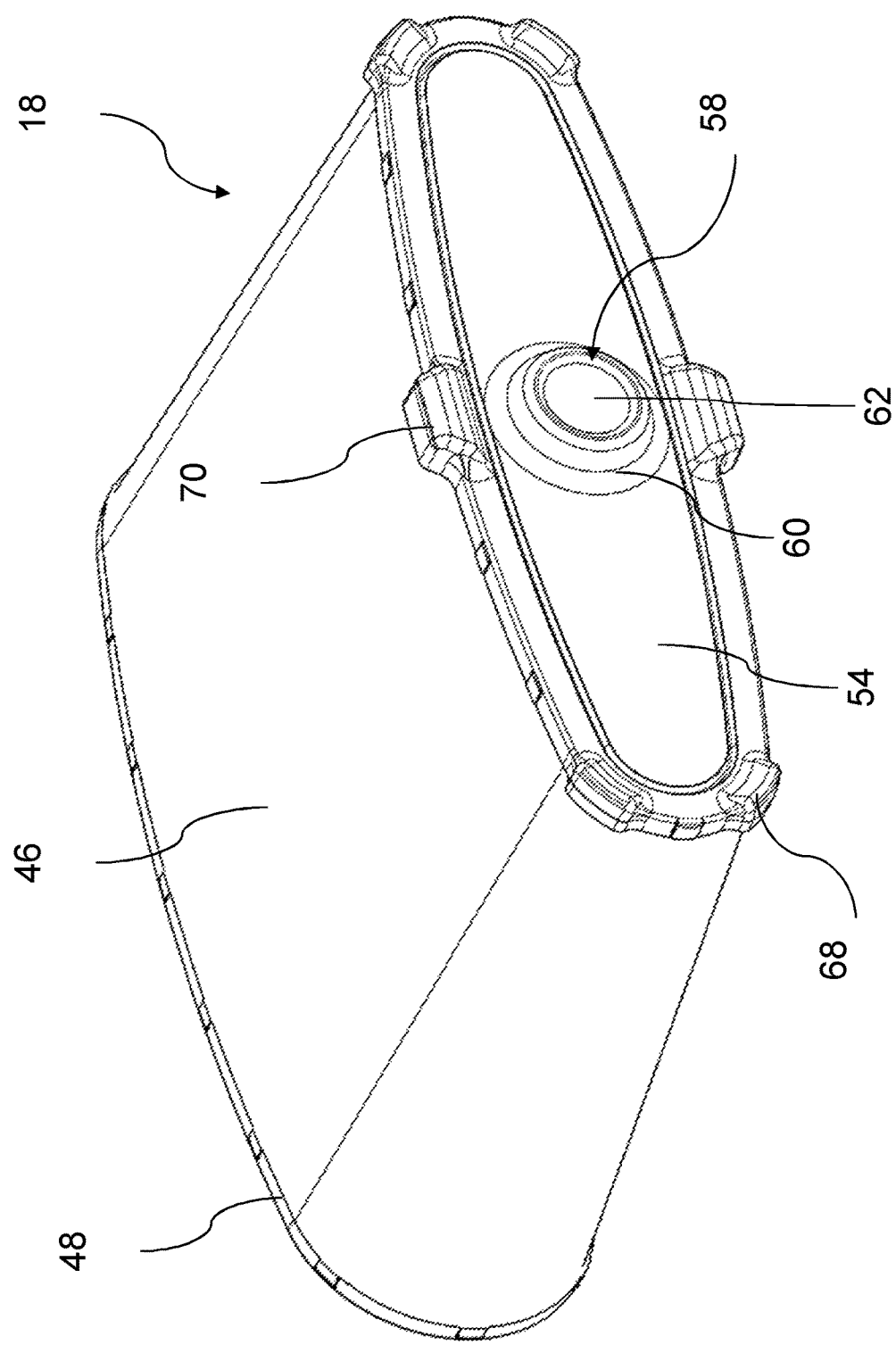

In the seventh embodiment of FIG. 13, the support element 58 has a round cross-section. The end face of the radially outer element supporting portion 60 has a bulge-like contour. The radially inner element supporting portion 62 is configured as a depression. The end face of the radially inner element supporting portion 62 has a surface contour similar to the profile of a spherical segment.

In the eighth embodiment of FIG. 14, the support element 58 has a round cross-section. The end face of the radially outer element supporting portion 60 extends as a flank which is inclined with respect to the element axis and gradually transitions into the end face of the radially inner element supporting portion 62. The radially inner element supporting portion 62 is configured as an elevation. The end face of the radially inner element supporting portion 62 has a surface contour similar to the profile of a spherical segment.

What is claimed is:

1. A filter element of an air filter, comprising:
    at least one filter medium for filtering air, which at least partially surrounds an element interior of the filter element with respect to an element axis;
    wherein the filter element replaceably arranged within in an openable filter housing having at least one inlet for air to be purified and at least one outlet for purified air in such a way that said filter element separates the at least one inlet from the at least one outlet;
    wherein the filter element has an end plate secured onto and covering an axial end face of the filter medium;
    wherein the filter element has at least one element-side support element on an outer side of the end plate, facing away from the element interior, the at least one element-side support element is axial with respect to the element axis;
    wherein the at least one element-side support element includes
        at least one radially outer element supporting portion, embodied as a circumferentially closed oval annular projection, projecting outwardly from the end disk in an axial direction away from the element interior to its end face;
    wherein the oval of the circumferentially closed oval annular projection is formed as a rectangle having rounded corners, having:
        a long traverse axis running through a center of the circumferentially closed oval annular projection, intersecting a widest diameter of an oval perimeter of the circumferentially closed oval annular projection;
        a short traverse axis running through the center of the circumferentially closed oval annular projection, the short traverse axis perpendicular to the long traverse axis and having a shorter length than the long traverse axis;

wherein the circumferentially closed oval annular projection has a surface contour deviating from a flat surface on its axial end face facing away from the element interiors;

wherein the at least one element-side support element has at least one element supporting portion arranged within and surround by the circumferentially closed oval annular projection, and which is coaxial or eccentric with respect to the element axis;

wherein the at least one element supporting portion forms a closed bottom, closing the to the circumferentially closed oval annular projection;

wherein the axial end face of the circumferentially closed oval annular projection has a zigzag-shaped surface contour formed by triangular shaped axial projections.

2. The filter element according to claim 1, wherein the at least one element supporting portion comprises
at least one element-side form locking portion adapted for form locking connection with at least one corresponding housing-side form locking portion.

3. The filter element according to claim 1, wherein
the at least one support element has at least one element supporting portion extends circumferentially with respect to the element axis.

4. The filter element according to claim 1, wherein
the at least one element supporting portion includes a surface contour formed on the at least one end face of the filter element;
wherein the surface contour is prefabricated and realized separately from the filter housing.

5. The filter element according to claim 1, wherein
the at least one element-side support element is arranged coaxially with respect to the element axis on the at least one end face of the filter element.

6. The filter element according to claim 1, wherein
the at least one element-side support element is arranged on an end plate of the filter element.

7. A filter housing of an air filter
wherein the filter housing is openable for installation of a filter element according to claim 1 therein;
wherein the filter housing has at least one inlet for air to be purified and at least one outlet for purified air;
wherein at least one housing supporting portion is arranged on the side of the filter housing, which housing supporting portion, at least in the installed state of the at least one filter element in the filter housing, has a surface contour deviating from a flat surface on at least one end face which faces the filter element axially with respect to a housing axis, which housing axis extends parallel or axially to the element axis when the air filter is installed.

8. An air filter, comprising:
a filter housing, the filter housing openable for installation of at least one filter element therein;
wherein the filter housing has at least one inlet for air to be purified and at least one outlet for purified air;
wherein the at least one filter element is replaceably installed into the filter housing, the at least one filter element including:
at least one filter medium for filtering air, which at least partially surrounds an element interior of the filter element with respect to an element axis;
wherein the filter element replaceably arranged within the filter housing having at least one inlet for air to be purified and at least one outlet for purified air in such a way that said filter element separates the at least one inlet from the at least one outlet;
wherein the filter element has an end plate secured onto an covering an axial end face of the filter medium;
wherein the filter element has at least one element-side support element on an outer side of the end plate, facing away from the element interior, the at least one element-side support element is axial with respect to the element axis;
wherein the at least one element-side support element includes
at least one radially outer element supporting portion, embodied as a circumferentially closed oval annular projection, projecting outwardly from the end disk in an axial direction away from the element interior to its end face;
wherein the oval of the circumferentially closed oval annular projection is formed as a rectangle having rounded corners, having:
a long traverse axis running through a center of the circumferentially closed oval annular projection, intersecting a widest diameter of an oval perimeter of the circumferentially closed oval annular projection;
a short traverse axis running through the center of the circumferentially closed oval annular projection, the short traverse axis perpendicular to the long traverse axis and having a shorter length than the long traverse axis;
wherein the circumferentially closed oval annular projection has a surface contour deviating from a flat surface on its axial end face facing away from the element interior;
wherein the at least one element-side support element has at least one element supporting portion arranged within and surround by the circumferentially closed oval annular projection, and which is coaxial or eccentric with respect to the element axis:
wherein the at least one element supporting portion forms a closed bottom, closing the to the circumferentially closed oval annular projection;
wherein the axial end face of the circumferentially closed oval annular projection has a zigzag-shaped surface contour formed by triangular shaped axial projections;
wherein at least one housing supporting portion is arranged on the side of the filter housing, which housing supporting portion, at least in the installed state of the at least one filter element in the filter housing, has a surface contour deviating from a flat surface on at least one end face which faces the filter element axially with respect to a housing axis, which housing axis extends parallel or axially to the element axis when the air filter is installed.

9. A filter element of an air filter, comprising:
at least one filter medium for filtering air, which at least partially surrounds an element interior of the filter element with respect to an element axis;
wherein the filter element replaceably arranged within in an openable filter housing having at least one inlet for air to be purified and at least one outlet for purified air in such a way that said filter element separates the at least one inlet from the at least one outlet;
wherein the filter element has an end plate secured onto an and covering an axial end face of the filter medium;
wherein the filter element has at least one element-side support element on an outer side of the end plate, facing away from the element interior, the at least one element-side support element is axial with respect to the element axis;
wherein the at least one element-side support element includes
  at least one radially outer element supporting portion, embodied as a circumferentially closed oval annular projection, projecting outwardly from the end disk in an axial direction away from the element interior to its end face;
wherein the oval of the circumferentially closed oval annular projection is formed as a rectangle having rounded corners, having:
  a long traverse axis running through a center of the circumferentially closed oval annular projection, intersecting a widest diameter of an oval perimeter of the circumferentially closed oval annular projection;
  a short traverse axis running through the center of the circumferentially closed oval annular projection, the short traverse axis perpendicular to the long traverse axis and having a shorter length than the long traverse axis;
  wherein the circumferentially closed oval annular projection has a surface contour deviating from a flat surface on its axial end face facing away from the element interior:
wherein the circumferentially closed oval annular projection has a radially inner element supporting portion selected from a group consisting of:
  a pyramid-shaped depression having a rectangular base, and a tip of the pyramid arranged in a radial interior of the circumferentially closed oval annular projection, the tip arranged on the element axis; wherein the circumferentially closed annular oval projection radially surrounds the pyramid depression; and wherein the tip of the pyramid-shaped depression projects axially inwardly towards the element interior; or
  a pyramid-shaped projection having a rectangular base, and a tip of the pyramid arranged in a radial interior of the circumferentially closed oval annular projection, the tip arranged on the element axis; wherein the circumferentially closed annular oval projection radially surrounds the pyramid depression; and wherein the tip of the pyramid-shaped projection projects axially outwardly away from the end plate; or
  a depression formed as a half circular-cylinder depression with rounded end edges; wherein the circumferentially closed annular oval projection radially surrounds the half circular-cylinder depression; and wherein the half circular-cylinder depression projects axially inwardly towards the element interior; or
  a projection formed as a half circular-cylinder projection with rounded end edges; wherein the circumferentially closed annular oval projection radially surrounds the half circular-cylinder projection; and wherein the half circular-cylinder projection projects axially outwardly away from the end plate.

10. An air filter comprising:
a filter housing, the filter housing openable for installation of at least one filter element therein;
wherein the filter housing has at least one inlet for air to be purified and at least one outlet for purified air;
wherein the at least one filter element is replaceably installed into the filter housing, the at least one filter element including:
  at least one filter medium for filtering air, which at least partially surrounds an element interior of the filter element with respect to an element axis;
wherein the filter element replaceably arranged within the filter housing having at least one inlet for air to be purified and at least one outlet for purified air in such a way that said filter element separates the at least one inlet from the at least one outlet:
wherein the filter element has an end plate secured onto an covering an axial end face of the filter medium;
wherein the filter element has at least one element-side support element on an outer side of the end plate, facing away from the element interior, the at least one element-side support element is axial with respect to the element axis;
wherein the at least one element-side support element includes
  at least one radially outer element supporting portion, embodied as a circumferentially closed oval annular projection, projecting outwardly from the end disk in an axial direction away from the element interior to its end face;
wherein the oval of the circumferentially closed oval annular projection is formed as a rectangle having rounded corners, having:
  a long traverse axis running through a center of the circumferentially closed oval annular projection, intersecting a widest diameter of an oval perimeter of the circumferentially closed oval annular projection;
  a short traverse axis running through the center of the circumferentially closed oval annular projection, the short traverse axis perpendicular to the long traverse axis and having a shorter length than the long traverse axis;
  wherein the circumferentially closed oval annular projection has a surface contour deviating from a flat surface on its axial end face facing away from the element interior;
wherein the circumferentially closed oval annular projection has a radially inner element supporting portion selected from a group consisting of:
  a pyramid-shaped depression having a rectangular base, and a tip of the pyramid arranged in a radial interior of the circumferentially closed oval annular projection, the tip arranged on the element axis; wherein the circumferentially closed annular oval projection radially surrounds the pyramid depression; and wherein the tip of the pyramid-shaped depression projects axially inwardly towards the element interior; or
  a pyramid-shaped projection having a rectangular base, and a tip of the pyramid arranged in a radial interior of the circumferentially closed oval annular projection, the tip arranged on the element axis; wherein the circumferentially closed annular oval projection radially surrounds the pyramid depression; and wherein the tip of the pyramid-shaped projection projects axially outwardly away from the end plate; or
  a depression formed as a half circular-cylinder depression with rounded end edges; wherein the circumferentially closed annular oval projection radially surrounds the half circular-cylinder depression; and wherein the half circular-cylinder depression projects axially inwardly towards the element interior; or a projection formed as a half circular-cylinder projection with rounded end edges; wherein the circumferentially closed annular oval projection radially surrounds the half circular-cylinder projection; and wherein the half circular-cylinder projection projects axially outwardly away from the end plate;

wherein at least one housing supporting portion is arranged on the side of the filter housing, which housing supporting portion, at least in the installed state of the at least one filter element in the filter housing, has a surface contour deviating from a flat surface on at least one end face which faces the filter element axially with respect to a housing axis, which housing axis extends parallel or axially to the element axis when the air filter is installed.

\* \* \* \* \*